United States Patent
Gorbachov

(10) Patent No.: US 8,073,401 B2
(45) Date of Patent: Dec. 6, 2011

(54) MULTI MODE RADIO FREQUENCY TRANSCEIVER FRONT END CIRCUIT WITH INTER-STAGE MATCHING CIRCUIT

(75) Inventor: Oleksandr Gorbachov, Kiev (UA)

(73) Assignee: RFaxis, Inc., Irvine, CA (US)

( * ) Notice: Subject to any disclaimer, the term of this patent is extended or adjusted under 35 U.S.C. 154(b) by 346 days.

(21) Appl. No.: 12/428,419

(22) Filed: Apr. 22, 2009

(65) Prior Publication Data

US 2010/0210223 A1   Aug. 19, 2010

Related U.S. Application Data

(60) Provisional application No. 61/153,194, filed on Feb. 17, 2009.

(51) Int. Cl.
 *H04B 1/44* (2006.01)
(52) U.S. Cl. ........................................ 455/83; 455/553.1
(58) Field of Classification Search .................. None
See application file for complete search history.

(56) References Cited

U.S. PATENT DOCUMENTS

| | | | |
|---|---|---|---|
| 5,962,880 A | 10/1999 | Oda et al. |
| 6,043,714 A | 3/2000 | Yamamoto et al. |
| 6,108,313 A | 8/2000 | Lee et al. |
| 6,308,047 B1 | 10/2001 | Yamamoto et al. |
| 6,498,535 B1 | 12/2002 | Allen et al. |
| 6,529,080 B1 | 3/2003 | Seymour et al. |
| 6,556,075 B1 | 4/2003 | Jordan |
| 6,735,418 B1 | 5/2004 | MacNally et al. |
| 6,771,475 B2 | 8/2004 | Leete |
| 6,977,552 B2 | 12/2005 | Macedo |
| 6,998,709 B2 | 2/2006 | Khorram |
| 7,120,427 B1 | 10/2006 | Adams et al. |
| 7,315,730 B2 | 1/2008 | Galan |
| 2003/0228848 A1 | 12/2003 | Escoffier et al. |
| 2004/0251960 A1 | 12/2004 | Macedo |
| 2006/0035601 A1 | 2/2006 | Seo |
| 2006/0068837 A1 | 3/2006 | Malone |
| 2006/0270367 A1 | 11/2006 | Burgener et al. |

(Continued)

FOREIGN PATENT DOCUMENTS

WO   2008/002697   3/2008

OTHER PUBLICATIONS

SiGe PA Enables Smallest System Footprint for Embedded WLAN; Semiconductor Online; Dec. 15, 2008; 3 pages.

(Continued)

*Primary Examiner* — Lincoln Donovan
*Assistant Examiner* — Terry L Englund
(74) *Attorney, Agent, or Firm* — Stetina Brunda Garred & Brucker

(57) ABSTRACT

A front end circuit for coupling an antenna to a first radio frequency (RF) transceiver and a second RF transceiver is contemplated. The RF transceivers have a signal input, a signal output, a receive enable line and a transmit enable line. In addition to an antenna port, the front end circuit has a first power amplifier and a first low noise amplifier both coupled to first RF transceiver, and a second power amplifier and a second low noise amplifier both coupled to the second RF transceiver. The front end circuit includes a matching network that couples the power amplifiers and the low noise amplifiers, the various outputs and inputs thereof being common.

20 Claims, 5 Drawing Sheets

U.S. PATENT DOCUMENTS

| | | | |
|---|---|---|---|
| 2006/0290421 A1 | 12/2006 | Ichitsubo et al. | |
| 2007/0194859 A1 | 8/2007 | Brobston et al. | |
| 2007/0232241 A1 | 10/2007 | Carley et al. | |
| 2008/0089252 A1 | 4/2008 | Choi | |
| 2008/0182526 A1 | 7/2008 | Moloudi et al. | |
| 2008/0279262 A1 | 11/2008 | Shanjani | |
| 2009/0036065 A1 | 2/2009 | Siu | |
| 2009/0207764 A1* | 8/2009 | Fukamachi et al. | 370/297 |
| 2010/0202324 A1* | 8/2010 | Gorbachov | 370/277 |
| 2010/0203843 A1* | 8/2010 | Gorbachov | 455/78 |
| 2010/0203844 A1* | 8/2010 | Gorbachov | 455/83 |
| 2010/0203845 A1* | 8/2010 | Gorbachov | 455/83 |
| 2010/0203846 A1* | 8/2010 | Gorbachov | 455/83 |
| 2010/0203847 A1* | 8/2010 | Gorbachov | 455/84 |

OTHER PUBLICATIONS

WLAN & WiMAX from Sirenza: Sirenza Microdevices SZA Series Linear PAs for WiFi/WiBRO/WiMAX; 14 pages.

Skyworks: SKY65336; 2.4 GHz Transmit/Receive Front-End Module with Integrated LNA; Skyworks Solutions, Inc.; Aug. 20, 2008; 2 pages.

Skyworks; SKY65337; 2.4 GHz Transmit/Receive Front-End Module; Skyworks Solutions, Inc.; Aug. 20, 2008; 2 pages.

Skyworks; SKY65241-12: WLAN 802.11a, b, g, n Dual-Band Intera Front-End Module Single Antenna; Skyworks Solutions, Inc.; Mar. 12, 2008; 9 pages.

Skyworks; SKY65243-11: WLAN 802.11a b, g, n Dual-Band Intera Front-End Module Dual Antennas; Skyworks Solutions, Inc.; Mar. 12, 2008; 8 pages.

Skyworks; SKY65256-11: WLAN 802.11a, b, g, n Dual-Band Front-End Module Single Antenna; Skyworks Solutions, Inc.; Sep. 28, 2007; 10 pages.

Skyworks; SKY65228-11: WLAN 802.11n Single Band 4.9-5.85 GHz MIMO Intera Front-End Module; Skyworks Solutions, Inc.; Oct. 9, 2007; 9 pages.

Skyworks; SKY65206-13: WLAN 802.11 b/g Intera Front-End Module; Skyworks Solutions, Inc.; Aug. 21, 2007; 7 pages.

Skyworks; SKY65249-11: WLAN 802.11b, g, n Intera Front-End Module; Skyworks Solutions, Inc.; Nov. 30, 2007; 9 pages.

Skyworks; SKY65227-11: WLAN 802.11n Single Band Intera 2.4 GHz MIMO Intera Front-End Module; Skyworks Solutions, Inc.; Oct. 9, 2007; 9 pages.

Skyworks; SKY65230-11: WLAN 802.11 n 2 x 2 MIMO Intera Front-End Module with 3 Antenna Ports; Skyworks Solutions, Inc.; Oct. 9, 2007; 13 pages.

Skyworks; SKY65225-11: WLAN 802.11n 2 x 2 MIMO Intera Front-End Module; Skyworks Solutions, Inc.; May 7, 2007; 11 pages.

Skyworks; SKY65135: WLAN Power Amplifier; Skyworks Solutions, Inc.; Mar. 26, 2007; 13 pages.

Skyworks; SKY65209: WLAN 802.11b/g Front-End Module ; Skyworks Solutions, Inc.; Jan. 18, 2006; 8 pages.

4.9-5.8 GHz High-Linearity Power Amplifier SST11LP11; SST Communications Corp; 2005, 14 pages.

4.9-5.8 GHz High-Linearity Power Amplifier SST11LP12; SST Communications Corp; 2005, 14 pages.

2.4 GHz Power Amplifier SST12LP00; SST Communications Corp; 2005, 9 pages.

2.4 GHz High-Linearity Power Amplifier SST12LP10; SST Communications Corp; 2005, 12 pages.

2.4 GHz Power Amplifier SST12LP14; SST Communications Corp; 2005, 12 pages.

2.4 GHz High-Power, High-Gain Amplifier SST12LP15; SST Communications Corp; 2005, 12 pages.

2.4 GHz High-Power, High-Gain Amplifier SST12LP15A; SST Communications Corp; 2005, 12 pages.

STLC2500C: Bluetooth EDR Single Chip Data Brief; STMicroelectronics; Jan. 2006, 4 pages.

STLC4550: Single Chip 802.11b/g WLAN radio Data Brief; STMicroelectronics; Feb. 2006, 5 pages.

ZigBee—compliant wireless control and sensoring network solutions; STMicroelectronics; Jun. 2006; 8 pages.

Amin, Yasar, et al; Integration of Passives for Receiver Front-End for 5GHz Wireless LAN Applications; Royal Institute of Technology, Sweden & U of Engineering & Tech, Taxila, Pakistan; p. 24-29.

Texas Instruments: CC2591; 2.4-GHz RF Front End, data sheet, Jun. 2008, Texas Instruments, Inc. 18 pages.

Texas Instruments: CC2436; High-Power Dual-Band (2.4-GHz and 4.9-GHz to 5.9-GHz) RF Front End, data sheet, May 2007; Texas Instruments, Inc. 15 pages.

Hoppenstein, Russell; High-Performance WiMAX RF Chipset Enable CPE and BTS Applications; Texas Instruments Inc.

Texas Instruments: Technology for Innovators: WiLink 4.0 single-chip mobile WLAN solutons Product Bulletin; 2006 Texas Instruments Inc., 2 pages.

Chipcon Products from Texas Instruments: CC2420; 2.4 GHz IEEE 802.15.4 / ZigBee-ready RF Transceiver; 2008, Texas Instruments Inc., 89 pages.

Chipcon Products from Texas Instruments: CC2430; A True System-on-Chip solution for 2.4 GHz IEEE 802.15.4 / ZigBee; 2007, Texas Instruments Inc., 212 pages.

Texas Instruments: CC2520 Datasheet; 2.4 GHz IEEE 802.15.4/ SIZBEE RF Transceiver; Dec. 2007; Texas Instruments Inc.; 2007; 128 pages.

Zheng, Shaoyong, et al.; Distributed Power Amplifier/Feedback Low Noise Amplifier Switch-Less Front-End; Dept. Electronic Engineering, City University of Hong Kong, Feb. 8, 2006, p. 1659-1662.

Masse, Cecile; Analog/RF Front End; A direct-conversion transmitter for WiMAX and WiBro applications; www.rfdesign.com ; Jan. 2006, 3 pages.

XBEE OEM RF Modules; ZigBee / 802.15.4 OEM RF Modules by MaxStream, Inc. Specifications; MaxStream, Inc., 2005, 2 pages.

Fanucci, L, et al.; A Novel Fully Integrated Antenna Switch for Wireless Systems; Pisa, Italy, 4 pages.

RFMD: Mobile Computing: Front End Module Portfolio; rfmd.com; 2009, 2 pages.

MAXIM: Application Note 686; QPSK Modulation Demystified; May 1, 2002, 7 pages.

An Introduction to Orthogonal Frequency Division Multiplex Technology; Keithley, 17 pages.

International Search Report PCT/US2009/038621; Jul. 20, 2009.

International Search Report PCT/US2009/041834; Jun. 17, 2009.

ATMEL: Bluetooth Front-end IC T7024 Design Guide; Jun. 2004; 18 pages.

ATMEL: Integrated SiGe Front-end RF ICs;2003, 2 pages.

ATMEL: 5-GHz WLAN Power Amplifier for 802.11a, ATR3515 Preliminary; 2004, 7 pages.

ATMEL: High Gain Power Amplifier for 802.11b/g WLAN Systems, ATR7032 Preliminary; 2006, 15 pages.

ATMEL: ZigBee IEEE 802.15.4 Radio Transceiver; AT86RF230, Preliminary; 2007, 82 pages.

ANADIGICS: AWM6430; 3.5 GHz WiMAX Power Amplifier Module, Advanced Product Information—Rev. 0.1; Jan. 2005; 12 pages.

BROADCOM; BCM4328 Product Brief; Air Force One Single-Chip IEEE 802.11a/b/g MAC/Baseband/Radio With Integrated CPU; Dec. 5, 2006; 2 pages.

BROADCOM; BCM4326 Product Brief; Air Force One Single-Chip IEEE 802.11b/g MAC/Baseband/Radio With Integrated CPU; Dec. 5, 2006; 2 pages.

BROADCOM: BCM94318 Product Brief: Airforce One Chip 802.11 Reference Design; Oct. 7, 2004; 2 pages.

Xin He, Fully Integrated Transceiver Design in SOI Processes, a Dissertation, Kansas State University, 2004, 129 pages.

Schlegel, Gunther, Sr.; Improving Sensitivity of RF-Based AMI Front-End Systems; 16 pages.

MAXIM: Industry's First Ultra-Low-Power, 802.11g/b RF Transceiver to Integrate PA, Rx/Tx/Antenna Diversity Switches, and Crystal Oscillator Circuitry; Apr. 30, 2008; 2 pages.

MAXIM: MAX2830 Industry's First802.11G/B RF Transceiver with Integrated PA, Rx/Tx and Antenna Switches; Apr. 30, 2008; 3 pages.

MESHNETICS: ZigBit Amp OEM Modules; ZDM-A1281-PN/ PNO (MNZG-A24-UFL/UO) Revision 2.2; Ultra-Compact 2.4GHz 802.15.4/ZigBee Modules with Power Amplifier for Wireless Networking Applications; Oct. 2008, 18 pages.

MESHNETICS M2M-100-2008: ZigBit Amp Module; 2.4 GHz Amplified Modules for IEEE 802.15.4/ZigBee Wireless Mesh Networking Applications; 2 pages.
MESHNETICS: ZigBit Amp OEM Modules ZDM-A1281-PN/PNO Revision 2.1; Ultra-Compact 2.4GHz 802.15.4/ZigBee Modules with Power Amplifier for Wireless Networking Applications; Dec. 2007, 15 pages.
MURATA MF2400PJ-SF0702; PA MMIC for 2.4GHz Wireless Communication; Jan. 18, 2003; 11 pages.
CEL California Eastern Laboratories: Class 1 Power Amplifiers for Bluetooth; 1 page.
CEL; GaAs Integrated Circuit PG2250T5N; 1.8 V, Power Amplifier for Bluetooth Class 1; NEC Electronics Corp.; 2006, 12 pages.
CEL NEC's Power Amplifier for Bluetooth Class 1: UPG2301TQ Data Sheet; Feb. 4, 2004; 7 pages.
CEL: GaAs HBT Integrated Circuit PG2314T5N: Power Amplifier for Bluetooth Class 1; Jul. 2006, 10 pages.
CEL Application Note: AN1048 UPG2150T5L Switch; Sep. 29, 2005, 1 page.
CEL California Eastern Laboratories: AN1049 UPG2314T5N HBT PA IC for Bluetooth and ZigBee; Oct. 17, 2006; 5 pages.
RT2501 Wireless Chipset 802.11 b/g solution featuring Packet-OVERDIRVE Technology; Ralink Technology Corp; 2006, 1 page.
RT2501U; USB2.0 Wireless Chipset 802.11 b/g solution featuring Packet-OVERDIRVE Technology; Ralink Technology Corp., 2006, 1 page.
RT2600 MIMO XR Wirless Chipset 802.11b/g solution featuring Packet-OVERDRIVE and Range-OVERDIRVE Technologies; Ralink Technology Corp; 2006, 1 page.
RT2700 MIMO Wireless Chipset Family; 802.11n Solution featuring MIMObility Technology; Ralink Technology Corp; 2006, 2 pages.
RT2800 MIMO Wireless Chipset Family 802.11n Solution featuring MIMObility Technology; Ralink Technology Corp; 2006, 2 pages.
RT5201 Wireless Chipset 802.11 a/b/g solution featuring Packet-OVERDIRVE Technology; Ralink Technology Corp; 2006, 1 page.
RT5201U USB 2.0 Wireless Chipset 802.11 a/b/g solution featuring Packet-OVERDIRVE Technology; Ralink Technology Corp; 2006, 1 page.
RT5600 MIMO XR Wireless Chipset 802.11 a/b/g solution featuring Packet-OVERDIRVE and Range-OVERDIRVE Technologies; Ralink Technology Corp; 2006, 1 page.
Agnelli, Federico, et al; Wireless Multi-Standard Terminals: System Analysis and Design of a Reconfigurable RF Front-end; IEEE Circuits and Systems Magazine; First Quarter 2006; p. 38-59.
Cutler, Tim; ZigBee: RF power options in ZigBee solutions; Emerging Wireless Technology/A Supplement to RF Design; www.rfdesign.com; Mar. 2006; p. 18-21.
RFMD Preliminary: RF5263: 3.3V to 5.0V, 2.5GHz Linear Power Amplifier; pp. 7-31 to 7-32.
RFMD: RF5300: 3V, 5GHz Linear Power Amplifier pp. 2-655 to 2-660.
RFMD: RF5163: 3V-5V, 2.5 GHZ Linear Power Amplifier; pp. 2-627 to 2-638.
RFMD SiW1722B: Bluetooth Transceiver Solution for CDMA and WCDMA Mobile Phones; rfmd.com; Oct. 2006; 2 pages.
RFMD RF5924 3.7V, Single-Band Front-End Module pp. 8-1 to 8-2.
RFMD RF5122 3V to 4.5V, 2.4GHz to 2.5GHz Linear Power Amplifier; 12 pages.
Richwave RTC6682 VO.3 Data Sheet Aug. 2006; www.richwave.com.tw; 7 pages.
WLAN WiMAX PA & FEM Market, Feb. 12, 2009; 158 page presentation.
Cirronet ZigBee High Power Module ZMN2405HP; Oct. 28, 2007; 6 pages.
Cirronet ZigBee High Power Module ZMN2430HP; Oct. 28, 2007; 6 pages.
Cirronet ZigBee Matching RF power performance to ZigBee apps—Electronic Products; 4 pages; http://www2.electronicproducts.com/PrintArticle.aspx?ArticleURL=cirronet.feb2006.html.
Design of a Dual Band Wireless LAN SiGe-Bipolar Power Amplifier; from Sep. 2004 High Frequency Electronics; 8 pages.
EPCOS WLAN Modules Preliminary Datasheet R041_M01; Jun. 20, 2006; 14 pages.
EMBER Datasheet; EM2420 2.4 GHz IEEE 802.15.4 / ZigBee RF Transceiver; Copyright 2003, 2004 by Ember Corporation; 89 pages.
Free2Move Class 1 Bluetooth Module—F2M03C1 Datasheet; Rev. Sep. 13, 2005; 46 pages.
Freescale Semiconductor Technical Data Document No. MC13191/D; Rev. 1.2 Apr. 2005; MC13191: 2.4 GHz ISM Band Low Power Transceiver; 24 pages.
Freescale Semiconductor Technical Data Document No. MC13192; Rev. 3.2 May 2007; MC13192: 2.4 GHz Low Power Transceiver for the IEEE 802.15.4 Standard; 24 pages.
Freescale Semiconductor; MC13191: 2.4 GHz Low Power Transceiver for the IEEE 802.15.4 Standard; Reference Manual; Document No. MC13191RM; Rev. 1.2; Apr. 2005; 92 pages.
Freescale Semiconductor Technical Data; Document No. MC13192; Rev. 2.8, Apr. 2005; MC13192/MC13193: 2.4 GHz Low Power Transceiver for the IEEE 802.15.4 Standard; 23 pages.
Freescale Semiconductor MC13192/MC13193: 2.4 GHz Low Power Transceiver for the IEEE 802.15.4 Standard; Reference Manual; Rev. 1.3 Apr. 2005; 111 pages.
California Eastern Laboratories: FreeStar ZFSM-100 Series ZigBee-Ready Modules; May 2008; 1 page.
California Eastern Laboratories; Apex ZAXM-201 Series ZigBee Pro-Ready Modules; CL596C.5.08; 1 page.
California Eastern Laboratories; Apex LT ZALM-301 Series ZigBee Pro-Ready Modules; CL596.LT.5.08; 1 page.
California Eastern Laboratories; ZIC2410 Datasheet; Rev. A; Document No. 0005-05-07-00-000; 119 pages.
CEL Preliminary Data Sheet APEX & APEX LT Series Transceiver Modules; ZAXM-201-1, ZALM-301-1; May 7, 2008; 17 pages.
CEL Preliminary Data Sheet Freestar Series Transceiver Module; ZFSM-101-1; May 7, 2008; 10 pages.
CEL Preliminary Data Sheet Matrix Transceiver Modules; ZMXM-400 Series; May 7, 2008; 12.
J. Trachewsky, et al.; Broadcom WLAN Chipset for 802.11a/b/g; Broadcom Corporation, CA, USA; Aug. 17, 2003; 42 pages.
ANADIGICS; AWL6254; 1.4 GHz 802.11b/g/n; WLAN PA, LNA, and RF Switch Data Sheet—Rev 2.0; Feb. 2008; 16 pages.
ANADIGICS; AWM6430; 3.3-3.6 GHz Power Amplifier Module; Preliminary Data Sheet; Rev 1.0; Jan. 2006; 12 pages.
Hickman, Robert; ANADIGICS; A New Technology for WLAN Power Amplifiers; Warren NJ; 28 pages.
Zhang, Weimin; A Low Voltage Fully-Integrated 0.18um CMOS Power Amplifier for 5GHz WLAN; Institute of Microelectronics, Singapore; 2002; 4 pages.
Copeland, Miles A.; 5-GHz SiGe HBT Monolithic Radio Transceiver with Tunable Filtering; IEEE Transactions on Microwave Theory and Techniques, vol. 48 No. 2, Feb. 1000, 12 pages.
Atheros AR3011—ROCm Solutions for Bluetooth; Radio-On-Chip for Mobile (ROCm) Products; Jan. 22, 2008; 2 pages.
Atheros AR3000—ROCm Solutions for Bluetooth Radio-On-Chip for Mobile (ROCm) Products; Jan. 22, 2008; AR3031; 2 pages.
Atheros ROCm Platform; Radio-On-Chip for Mobile (ROCm; AR6001GL; Embedded 802.11b/g Solution for Mobile and Battery-Operated Devices; 2006; 2 pages.
AR6002 Breaking the Power Barrier in Mobile WiFi; Aug. 28, 2008; 2 pages.
AR6001GL; Embedded 802.11b/g Solution for Mobile and Battery-Operated Devices; 2006; 2 pages.
AR6001XL; Embedded 802.11a/b/g Solution for Mobile and Battery-Operated Devices; 2006; 2 pages.
AR6101G; World's Most Integrated, Cost-Effective Single-Chip WLAN Handset Design Brings Voice-Over-WiFi to the Mainstream; 2006; 2 pages.
AR9285 Single-chip PCIe based on 802.11n 1-stream specification; Oct. 28, 2008; 2 pages.
AR9002AP-1S; AP/Router solution based on 802.11n 1-stream specification; Oct. 28, 2008; 2 pages.
Fully-Integrated RF Transceiver System-on-Chip for ZigBee/IEEE 802.15.4 Applications Announced; California Eastern Laboratories, 2 pages.
Bluetooth RF Module RB06 Series for QUALCOMM Based Handsets, Kyocera, 4 pages.
How MLO Works the Power of Passive Components; JMD RF Made Simple: Jacket Micro Devices: Modules; copyright 2006 Jacket Micro Devices, Inc., 2 pages.

* cited by examiner

MULTI MODE RADIO FREQUENCY TRANSCEIVER FRONT END CIRCUIT WITH INTER-STAGE MATCHING CIRCUIT

CROSS-REFERENCE TO RELATED APPLICATIONS

This application relates to and claims the benefit of U.S. Provisional Application No. 61/153,194, filed Feb. 17, 2009 and entitled SINGLE-BAND TRANSMIT-RECEIVE IC FOR WLAN AND BLUETOOTH OPERATING WITH SINGLE ANTENNA, which is wholly incorporated by reference herein.

STATEMENT RE: FEDERALLY SPONSORED RESEARCH/DEVELOPMENT

Not Applicable

BACKGROUND

1. Technical Field

The present invention relates generally to radio frequency (RF) signal circuitry, and more particularly, to single band transmit-receive front-end integrated circuits for time domain duplex communications.

2. Related Art

Wireless communications systems find application in numerous contexts involving information transfer over long and short distances alike, and there exists a wide range of modalities suited to meet the particular needs of each. These systems include cellular telephones and two-way radios for distant voice communications, as well as shorter-range data networks for computer systems, among many others. Generally, wireless communications involve a radio frequency (RF) carrier signal that is variously modulated to represent data, and the modulation, transmission, receipt, and demodulation of the signal conform to a set of standards for coordination of the same. For wireless data networks, such standards include Wireless LAN (IEEE 802.11x), Bluetooth (IEEE 802.15.1), and ZigBee (IEEE 802.15.4), which are understood to be time domain duplex systems where a bi-directional link is emulated on a time-divided single communications channel.

A fundamental component of any wireless communications system is the transceiver, that is, the combined transmitter and receiver circuitry. The transceiver, with its digital baseband subsystem, encodes the digital data to a baseband signal and modulates the baseband signal with an RF carrier signal. The modulation utilized for WLAN, Bluetooth and ZigBee include orthogonal frequency division multiplexing (OFDM), quadrature phase shift keying (QPSK), and quadrature amplitude modulation (16QAM, 64QAM). Upon receipt, the transceiver down-converts the RF signal, demodulates the baseband signal, and decodes the digital data represented by the baseband signal. An antenna connected to the transceiver converts the electrical signal to electromagnetic waves, and vice versa.

Almost all conventional electronic devices with wireless communication capabilities implement more than one system or standard. For example, a cellular telephone may include a WLAN subsystem for high-speed data transfers, in addition to a Bluetooth subsystem for concurrent pairing with wireless headsets and the like. Such multi-modality wireless communications systems include a separate transceiver for each of the different subsystems, and each transceiver may include a dedicated transmit (TX) line and a dedicated receive (RX) line. In the alternative, however, the transceiver may have a combined TX/RX line. In most cases, the WLAN transceiver has separate TX and RX lines, while the Bluetooth transceiver has a combined TX/RX line. The transmit line and the receive line of all of the transceivers are tied to a single antenna.

RF circuitry such as the transceiver is produced as integrated circuits, typically with complementary metal-oxide semiconductor (CMOS) technology, due in part to the successes in miniaturization and cost reduction efforts. Small geometry CMOS devices have reduced current draw and require lower battery voltages, thus being suitable for portable applications that have substantial power consumption limitations. Wireless communication links must be reliable and have high data throughput over wide distances, necessitating higher power levels at the antenna stage. For instance, the aforementioned Wireless LAN typically requires power levels of up to and above 20 dBm.

Higher power output, in turn, requires higher current and voltage levels in the RF circuitry. Many CMOS devices are currently produced with a 0.18-micron process, with advanced systems utilizing 130 nm, 90 nm, 65 nm, and 45 nm processes. The resulting integrated circuits have operating voltages in the range of 1.8 v to lower than 1.2 v because of the reduced break down voltages of the semiconductor devices therein. Although current draw is typically not an issue because of the existence of simple solutions involving multiple active devices connected in parallel, +20 dBm power levels at 1.8 v have been difficult to achieve, particularly for signals having envelope variations, as is the case with OFDM, QPSK, QAM, and the like. Indeed, peak power may be 5 dB to 10 dB higher than average due to stringent linearity requirements for the transmitted signal, and the typical 1 dB gain compression (P1 dB) of the signal may reach 24 dBm to 27 dBm. Increasing current draw introduces several new issues including decreased efficiency because of a greater proportion of power being lost as heat, and decreased battery life. Furthermore, the impedance is lowered for the same power level with increased current. Considering that most RF circuits have a 50-Ohm impedance, the design of matching circuits for decreased impedance also becomes an issue, typically due to increased power losses.

Conventional WLAN transceivers typically do not generate sufficient power or have sufficient sensitivity necessary for reliable communications. Current integrated circuit transceiver devices have transmit power levels of below 0dBm, though there are some devices that have power levels of about 10 dBm, which is still significantly less than the desired 20 dBm noted above. Accordingly, additional conditioning of the RF signal is necessary. With regard to Bluetooth transceivers, however, 0 dBm output at the antenna may be sufficient for class-3 operation, while 4 dBm may be sufficient for class-2 operation, so additional amplification may not be required.

The circuitry between the transceivers and the antenna is referred to as the front-end module, which includes a power amplifier for increased transmission power, and/or a low noise amplifier for increased reception sensitivity. Various filter circuits such as band pass filters may also be included to provide a clean transmission signal at the antenna, and/or to protect the reception circuitry from external blocking signals reaching the antenna. In order to rapidly switch between receive and transmit functions, and in order to prevent interference during the transitions between transmission and reception, the front-end module also typically includes an RF switch that is controlled by a general-purpose input/output line of the transceiver.

As noted above, conventional multi-modality wireless communications systems include multiple transceivers that are connected to a single antenna. WLAN, Bluetooth, and ZigBee are understood to share the same operating frequency band, that is, the industrial-scientific-medical (ISM) band of 2.4 GHz to 2.5 GHz, so simultaneous operation is not possible without substantial signal degradation. Accordingly, the operation of the two transceivers is scheduled according to predefined priority levels. In typical integrated systems with various combinations of WLAN, Bluetooth, ZigBee, or other time-domain duplex system, the RF switch is a single-pole, triple throw switch connecting the antenna to the input of the low noise amplifier for one of the transceivers, the output of the power amplifier for another one of the transceivers, or the combined input and output thereof. Further control over the operation of the power amplifier and the low noise amplifier may be possible with the enable output from the transceiver. The enable line may have varying voltages to control gain or setting the bias current of the transistors in the amplifier circuitry Interrelated performance, fabrication, and cost issues have necessitated the fabrication of the RF switch on a different substrate than the substrate of the power amplifier and the low noise amplifier. Power amplifiers are typically fabricated on a gallium arsenide (GaAs) substrate, which is understood to provide high breakdown voltages and reliability. Other substrates such as silicon germanium (SiGe) may also be utilized. Furthermore, the power amplifier can utilize hetero-junction bipolar transistors (HBT), metal-semiconductor field effect transistors (MESFET) or high electron mobility transistors (HEMT), with the HBT being the least costly to fabricate. Along these lines, the low noise amplifier may also be fabricated on a GaAs substrate with HBT transistors. However, because of high insertion loss or low isolation, an RF switch using HBT transistors suffers from poor performance characteristics.

Various solutions to the forgoing issues have been proposed. One involves a multi-die configuration in which the power amplifier and the low noise amplifier are fabricated on one die using HBT transistors, and the RF switch is fabricated on another die using, for example, HEMT transistors. Both of the dies are then encapsulated in a single package. The added costs associated with the GaAs substrate as compared to conventional silicon substrates, and the complex packaging process further elevates the cost of the front-end module fabricated in accordance therewith. Another proposal is directed to a composite GaAs substrate having both HBT and HEMT transistors for the power amplifier and the low noise amplifier, and the RF switch, respectively. Again, however, such integrated circuits are costly to manufacture. Yet another proposal is the use of a silicon substrate for the low noise amplifier, the power amplifier, and the RF switch. Because of poor isolation associated with silicon substrates, however, higher cost solutions such as silicon on insulator (SOI) may be used. These integrated circuits typically require a negative voltage generator, which results in a larger die for its bias circuitry. Additionally, spurious signals over a wide frequency range emitted by a charge pump for the negative voltage generator necessitates a physical separation thereof that further increases die size.

The RF switch thus represents a significant constraint on the design of transceiver front-ends. Accordingly, there is a need in the art for RF transmit/receive front-end circuits without conventional RF switches with sufficient transmitter output and receiver sensitivity for time-domain duplex applications.

BRIEF SUMMARY

According to one embodiment of the present invention, a front end circuit for coupling an antenna to a first radio frequency (RF) transceiver and a second RF transceiver is contemplated. Each of the RF transceivers may have a respective one of a signal input, a signal output, a receive enable line and a transmit enable line. The front end circuit may include an antenna port connectible to the antenna. Additionally, the front end circuit may include a first power amplifier that is coupled to the signal output of the first RF transceiver. The first power amplifier may include a first transmit control circuit coupled to the transmit enable line of the first RF transceiver. The front end circuit may also include a first low noise amplifier that is coupled to the signal input of the first RF transceiver. The first low noise amplifier may include a first receive control circuit that is coupled to the receive enable line of the first RF transceiver. Furthermore, there may be a second power amplifier that is coupled to the signal output of the second RF transceiver. The second power amplifier may include a second transmit control circuit that is coupled to the transmit enable line of the second RF transceiver. There may also be a second low noise amplifier that is coupled to the signal input of the second RF transceiver, where the second low noise amplifier includes a second receive control circuit that is coupled to the receive enable line of the second RF transceiver.

The front end circuit may also include a matching network that is coupled to the antenna port, the first power amplifier, the second power amplifier, the first low noise amplifier and the second low noise amplifier. Outputs of the first power amplifier and the second power amplifier and inputs of the first low noise amplifier and the second low noise amplifier may all be common.

An enable signal applied to the first transmit enable line, the second transmit enable line, the first receive enable line, or the second receive enable line may activate and set a bias point of the corresponding one of the first power amplifier, the second power amplifier, the first low noise amplifier, and the second low noise amplifier. The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of the presently preferred embodiment of the invention, and is not intended to represent the only form in which the present invention may be developed or utilized. The description sets forth the functions of the invention in connection with the illustrated embodiment. It is to be understood, however, that the same or equivalent functions may be accomplished by different embodiments that are also intended to be encompassed within the scope of the invention. It is further understood that the use of relational terms such as first and second and the like are used solely to distinguish one from another entity without necessarily requiring or implying any actual such relationship or order between such entities. The present application relates to co-pending U.S. patent application Ser. No. 12/412,226 entitled "Single-Band Transmit-Receive Front-End Integrated Circuits for Time-Domain Duplex Applications" filed Mar. 26, 2009, the disclosure of which is expressly incorporated by reference in its entirety herein.

Figure 1:
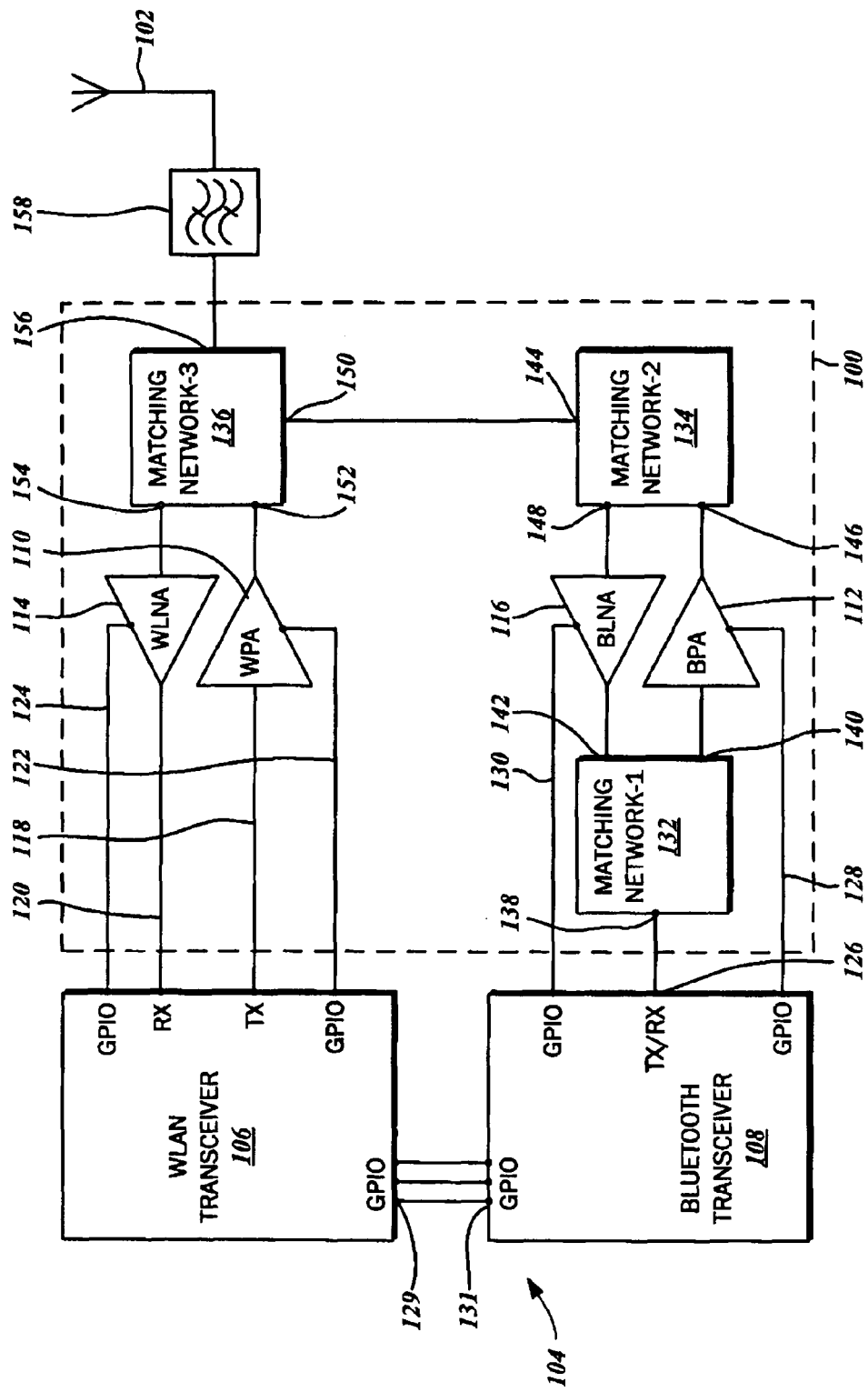
FIG. 1 is a block diagram of an exemplary front end circuit for a dual mode wireless communications system including a Wireless LAN (WLAN) transceiver and a Bluetooth transceiver.

With reference to the block diagram of FIG. 1, the present invention is generally directed to a front end circuit 100 that couples an antenna 102 to a dual-mode wireless communications system 104. By way of example only and not of limitation, it is contemplated that a first one of the modes is Wireless LAN (802.11x), with the wireless communications system 104 including a WLAN transceiver 106 that generates and receives a radio frequency (RF) signal compliant therewith. The exemplary embodiment of the dual-mode wireless communications system 104 further contemplates that a second one of the modes is Bluetooth (802.15.1), with a Bluetooth transceiver 108 receiving and generating the compliant RF signals. Other communications systems such as ZigBee (IEEE 802.15.4) are also envisioned, and transceivers therefor may be readily substituted. Predefined operating frequencies of the wireless communications system 104 are understood to vary between a few hundred MHz to 10 GHz. In particular, current WLAN standards specify the use of the industrial, scientific, and medical (ISM) band of 2.4 GHz to 2.5 GHz, as well as 4.9 GHz to 6 GHz. Additionally, Bluetooth is understood to operate in the 2.4 GHz to 2.5 GHz frequency range.

Reference to the particular modalities when specifying various components of the dual-mode communications system 104 and the front end circuit 100 (such as, for example, the WLAN transceiver 106 or the Bluetooth transceiver 108) are for the sake of clarity only to distinguish one similar component from another, and are not intended to be limiting. While the present disclosure sets forth a variety of configurations that are optimized for the foregoing communications modalities, those having ordinary skill in the art will recognize that the front end circuit 100 may be optimized for others, particularly those that involve time domain duplexing.

The RF signals generated by the transceivers 106, 108 typically have power levels of 0dBm, which is insufficient for transmission over anything but the shortest distances. Accordingly, the front end circuit 100 includes a WLAN power amplifier 110 and a Bluetooth power amplifier 112 for the WLAN transceivers 106 and Bluetooth transceiver 108, respectively. As will be detailed below, various embodiments contemplate +20 dBm and above power levels at the antenna 102, after the front end circuit 100 amplifies the RF signals.

The transmitted RF signals from the other nodes are received at the antenna 102, but are generally noisy and very weak. In order for the transceivers 106, 108 to properly demodulate and extract the data being carried thereon, a WLAN low noise amplifier 114 and a Bluetooth low noise amplifier 116, respectively, amplify the received RF signals.

As briefly noted above, the WLAN transceiver 106 and the Bluetooth transceiver 108 are often combined as above to utilize the single antenna 102 in mobile phone applications, where overall cost and size of the integrated circuit are driving design factors. The WLAN transceiver 106 is utilized for long distance and high data throughput applications such as web browsing, music and video download, and Voice-over-IP (VOIP) applications, while the Bluetooth transceiver 108 is utilized for short-range, low data rate connectivity such as for wireless headsets. As is known in the art, the WLAN transceiver 106 and the Bluetooth transceiver 108 may both be fabricated on a single die, share certain components, and communicate with each other.

In the example shown in FIG. 1, the WLAN transceiver 106 has a separate transmit line 118 and a receive line 120. The WLAN transmit line 118 is connected to an input of the WLAN power amplifier 110, and the WLAN receive line 120 is connected to an output of the WLAN low noise amplifier 114. A first general purpose input/output line 122 controls the WLAN power amplifier 110, while a second general purpose input/output line 124 controls the WLAN low noise amplifier 114, as will be considered in further detail below. These lines may also be referred to as the enable lines of the respective amplifiers (power amplifier or low noise amplifier) to which it is coupled. The general purpose input/output lines 122, 124 are understood to supply digital signals that are at predefined voltages for high and low states, though in some configurations, there is provided variable or analog voltages.

The Bluetooth transceiver 108, as is typical for low-cost applications, has a common transmit and receive line 126. As such, an input of the Bluetooth power amplifier 112 and the output of the Bluetooth low noise amplifier 116 is coupled to the common transmit receive line 126 over a matching network 132, as will be described in further detail below. A first general purpose input/output line 128 controls the Bluetooth power amplifier 112, and a second general purpose input/output line 130 controls the Bluetooth low noise amplifier 116. As with the general purpose input/output lines 122, 124 of the WLAN transceiver 106, the general purpose input/output lines 128, 130 of the Bluetooth transceiver 108 are understood to supply analog voltages or digital signals that are associated with the enabling or disabling of the respective amplifiers to which they are coupled.

An additional level of control over the Bluetooth transceiver 108 may be provided by the WLAN transceiver 106. Other general purpose input/output lines 129 of the WLAN transceiver 106 may be tied to other general purpose input/output lines 131 of the Bluetooth transceiver 108, so that the Bluetooth transceiver 108 is activated only as directed by the WLAN transceiver 106, or vice versa.

In accordance with various embodiments, the elimination of the conventional RF switch from the front end circuit 100 is generally contemplated. Consequently, all or substantially all of the components of the front end circuit 100 are envisioned to be fabricated on a single die with common transistor structures, though some embodiments are not necessarily limited thereto. In such, case, the components may be discretely fabricated. Suitable transistor structures include bipolar junction (BJT), hetero-junction bipolar (HBT), metal semiconductor field effect (MESFET), metal-oxide semiconductor field effect (MOSFET), and high electron mobility (HEMT). The single-die fabrication is understood to greatly reduce the footprint of the die for the front end circuit 100. The die may be fabricated from a silicon substrate, a gallium arsenide (GaAs) substrate, or any other suitable semiconductor material, and may be packaged in a conventional, low-cost quad frame no lead (QFN) plastic package. Any other appropriate transistor structure, semiconductor substrate, fabrication techniques, and packaging techniques may also be utilized in accordance with various teachings in the art in light of the performance parameters of the front end circuit 100.

Time domain duplex communications systems such as WLAN, Bluetooth, and ZigBee are understood to require the rapid switching between transmit and receive modes. Additionally, where there are multiple modalities sharing a single antenna 102 as in the dual mode wireless communications system 104, it is necessary to rapidly switch between transmit and receive modes of all such modalities interchangeably. Instead of a conventional single-pole, triple-throw switch, the inherent switching characteristics of the WLAN power amplifier 110, the Bluetooth power amplifier 112, the WLAN low noise amplifier 114, and the Bluetooth low noise amplifier 116 are utilized. In particular, the power amplifiers 110, 112 and the low noise amplifiers 114, 116 are selectively activated in a substantially exclusive relation to the others.

The various activation states will be referenced herein as the WLAN transmit state, the WLAN receive state, the Bluetooth transmit state, and the Bluetooth receive state. In the WLAN transmit state, the WLAN power amplifier 110 is activated with the first general purpose input/output line 122, and the RF signal generated by the WLAN transceiver 106 is amplified and transmitted over the antenna 102. The WLAN low noise amplifier 114, the Bluetooth power amplifier 112, and the Bluetooth low noise amplifier 116 remain deactivated. In the WLAN receive state, the WLAN low noise amplifier 114 is activated with the second general purpose input/output line 124, and the RF signal received via the antenna 102 is amplified and conveyed to the WLAN transceiver 106 over the receive line 120 for further processing. The WLAN power amplifier 110, the Bluetooth power amplifier 112, and the Bluetooth low noise amplifier 116 are deactivated. In the Bluetooth transmit state, the Bluetooth power amplifier 112 is activated with the first general purpose input/output line 128, with the RF signal generated by the Bluetooth transceiver 108 on the common transmit and receive line 126 being amplified and transmitted over the antenna 102. The WLAN power amplifier 110, the WLAN low noise amplifier 114, and the Bluetooth low noise amplifier 116 are deactivated. Finally, in the Bluetooth receive state, the Bluetooth low noise amplifier 116 is activated with the second general purpose input/output line 130, and the RF signal received over the antenna 102 is amplified and conveyed to the Bluetooth transceiver 108 via the common transmit and receive line 126 for further processing. The WLAN power amplifier 110, the WLAN low noise amplifier 114, and the Bluetooth power amplifier 112 are deactivated.

Simultaneous receive and transmit functions are also contemplated in accordance with the present invention. In particular, the WLAN power amplifier 110 may be activated at the same time as the Bluetooth power amplifier 112 such that separate RF signals generated by the WLAN transceiver 106 and the Bluetooth transceiver 108, respectively may both be transmitted, albeit at a different frequency but in a common band. Furthermore, the WLAN low noise amplifier 114 and the Bluetooth low noise amplifier 116 may be activated at the same time to receive simultaneously signals of different frequencies. It is understood that the WLAN transceiver 106 and the Bluetooth transceiver 108 can extract the information in such signals because of the different modulation formats.

The WLAN transmit chain, the WLAN receive chain, the Bluetooth transmit chain, and the Bluetooth receive chain all share a single connection to the antenna 102 via the front end circuit 100. Accordingly, an optimal configuration of the front end circuit 100 contemplates that the amplified RF signal from the WLAN power amplifier 110 is minimized at the WLAN receive line 120 and the combined transmit and receive line 126 of the Bluetooth transceiver 108. It is also contemplated that the received RF signal for the WLAN low noise amplifier 114 is minimized at the WLAN transmit line 118, as well as the Bluetooth transceiver 108 combined transmit and receive line 126. Similarly, the RF signal generated by the Bluetooth transceiver 108 and amplified by the Bluetooth power amplifier 112 is minimized at the WLAN transmit line 118 and the WLAN receive line 120 in an optimal configuration. The received RF signal for the Bluetooth low noise amplifier 116 is minimized at the WLAN transmit line 118 and the WLAN receive line 120. As indicated above, however, simultaneous WLAN and Bluetooth receive functionality is also envisioned. In the Bluetooth receive state, the RF signal has minimal influence on the Bluetooth power amplifier 112, and in the Bluetooth transmit state, the amplified RF signal has minimal influence on the Bluetooth low noise amplifier 116.

As utilized herein, the terms transmit chain and receive chain are understood to refer to the interconnected components of the front end circuit 100 and the transceivers 106, 108 that relate to the transmission or broadcast, and reception, of the RF signal. Some components, such as the antenna, are understood to be part of both the transmit chain and the receive chain, while other components such as the power amplifiers 110, 112 or the low noise amplifiers 114, 116 are understood to be exclusive to the transmit chain and the receive chain, respectively.

Without suitable isolation between the WLAN transmit chain, the WLAN receive chain, the Bluetooth transmit chain, and the Bluetooth receive chain, particularly with high output power levels, leakage of the transmitted RF signals into the receive chain may cause distortion of the same. Furthermore, a reverse voltage at the low noise amplifiers 114, 116 with a high power RF signal may exceed reliable operation parameters, potentially leading to permanent breakdown. It is understood, however, that the deactivated low noise amplifiers 114, 116 exert minimal influence on the remainder of the front end circuit 100.

In addition to such isolation considerations of the transmit and receive chains, the power amplifiers 110, 112 and the low noise amplifiers 114, 116 have a number of optimal performance characteristics. These include high linear power and high efficiency power with respect to the power amplifiers 110, 112 without transmitting excessive noise and spurious signals such as harmonics through the antenna 102. Additionally, the noise figure, or the amount of noise introduced into the RF signal by the low noise amplifiers 114, 116, is minimized, while having sufficient gain to offset any transmission losses and maximize sensitivity.

Thus, the front end circuit 100 includes a first matching network 132, a second matching network 134, and a third matching network 136. The first matching network 132 includes a first port 138 connected to the common transmit and receive line 126 of the Bluetooth transceiver 108, a second port 140 connected to the Bluetooth power amplifier 112, and a third port 142 connected to the Bluetooth low noise amplifier 116. The second matching network 134 includes a first port 144 connected to the third matching network 136, a second port 146 connected to the output of the Bluetooth power amplifier 112, and a third port 148 connected to the input of the Bluetooth low noise amplifier 116. The third matching network 136 includes a first port 150 connected to the first port 144 of the second matching network 134, a second port 152 connected to the output of the WLAN power amplifier 110, a third port 154 connected to the input of the WLAN low noise amplifier 114, and a fourth port 156 coupled to the antenna 102. Although not specifically shown in FIG. 1, the WLAN power amplifier 110 and the WLAN low noise amplifier 114 are both individually impedance matched to the WLAN transceiver 106.

The specificities regarding the configuration of the WLAN power amplifier 110, the WLAN low noise amplifier 114, the Bluetooth power amplifier 112, and the Bluetooth low noise amplifier 116 in relation to the aforementioned considerations will be described in greater detail below. It will be appreciated by those having ordinary skill in the art that such considerations are by way of example only and not of limitation. Furthermore, various performance trade-offs may be made in relation to the configuration of the front end circuit 100 while still being within the scope of the present invention.

The quality of the transmitted RF signal can be improved, and the receive chain can be protected from external blocking signals reaching the antenna 102 by the addition of a band pass filter 158. It is understood that the band pass filter 158 may reject harmonics and other spurious signals generated by the WLAN transceiver 106 or the Bluetooth transceiver 108. The rejection characteristics can be defined in accordance with the worst overall conditions for either the WLAN transceiver 106 or the Bluetooth transceiver 108, or in accordance with large blocking signals at the antenna during the receive operation.

Figure 2A:
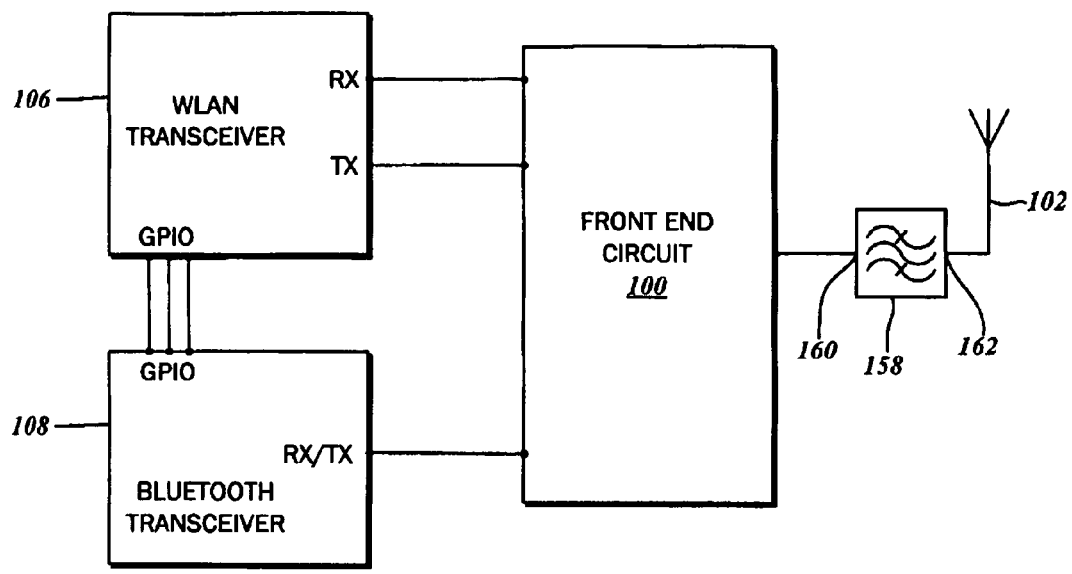
FIG. 2A is a block diagram of a first configuration of the present invention in which a band pass filter is coupled to the front end circuit and an antenna.

As best illustrated in FIG. 2A, a first embodiment contemplates the band pass filter 158 being disposed between the front end circuit 100 and the antenna 102. More particularly, the band pass filter 158 includes a first port 160 that is connected to the front end circuit, and a second port 162 that is coupled to the antenna 102. Referring back to the block diagram of FIG. 1, the first port 160 of the band pass filter may be coupled to a fourth port 156 of the third matching network 136. The band pass filter 158 is typically a low temperature co-fired ceramic (LTCC) or may be an integrated passive device (IPD/IPAD) that is fabricated on a GaAs substrate without an epitaxial layer, a sapphire substrate, or a glass substrate.

Figure 2B:
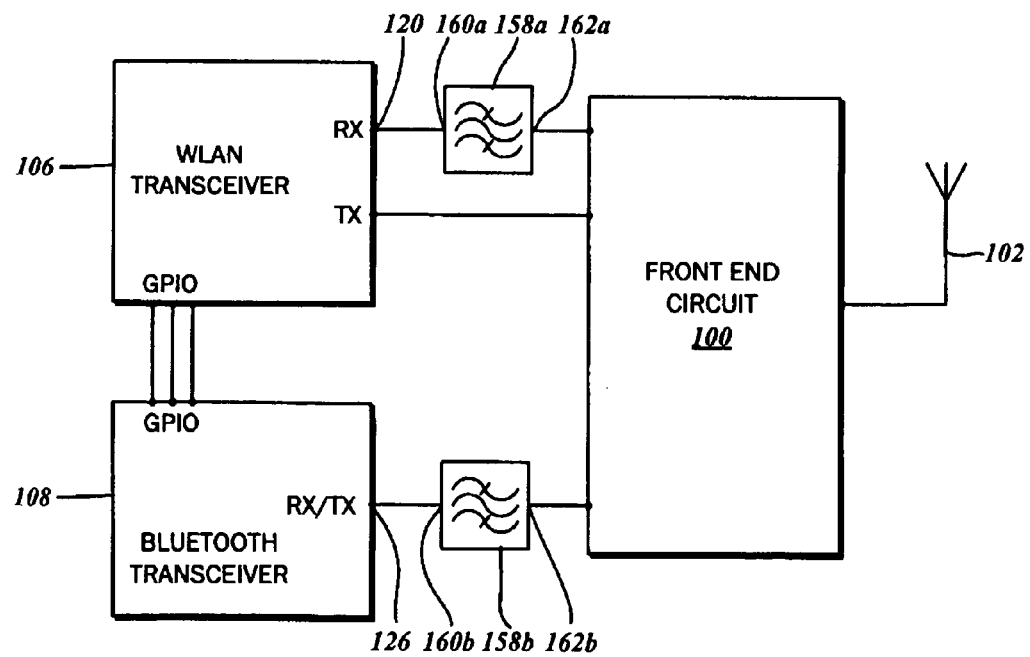
FIG. 2B is a block diagram of a second configuration in which a first band pass filter is coupled to the front end circuit and the WLAN transceiver, and a second band pass filter is coupled to the front end circuit and the Bluetooth transceiver.

In a second embodiment shown in FIG. 2B, a first band pass filter 158a is disposed between the WLAN transceiver 106 and the front end circuit 100, and a second band pass filter 158b is disposed between the Bluetooth transceiver 108 and the front end circuit 100. Specifically, the first band pass filter 158a has a first port 160a that is connected to the WLAN receive port 120, and a second port 162a that is connected to the front end circuit 100. It is contemplated that the second port 162a is connected to the output matching circuit of the WLAN low noise amplifier 114. The second band pass filter 158b includes a first port 160b connected to the common transmit and receive line 126 of the Bluetooth transceiver 108, and a second port 162b connected to the front end circuit 100. As will be described in further detail below, the second port 162b of the second band pass filter 158b may be connected to an input and output matching network 132 of the Bluetooth power amplifier 112 and low noise amplifier 116, respectively. This configuration is understood to substantially increase sensitivity of the WLAN and Bluetooth receive chains, and to decrease current draw of the power amplifiers 110, 112. As with the first embodiment previously described, the first and second band pass filters 158a, 158b may be integrated into the front end circuit 100 or be separate.

Figure 3:
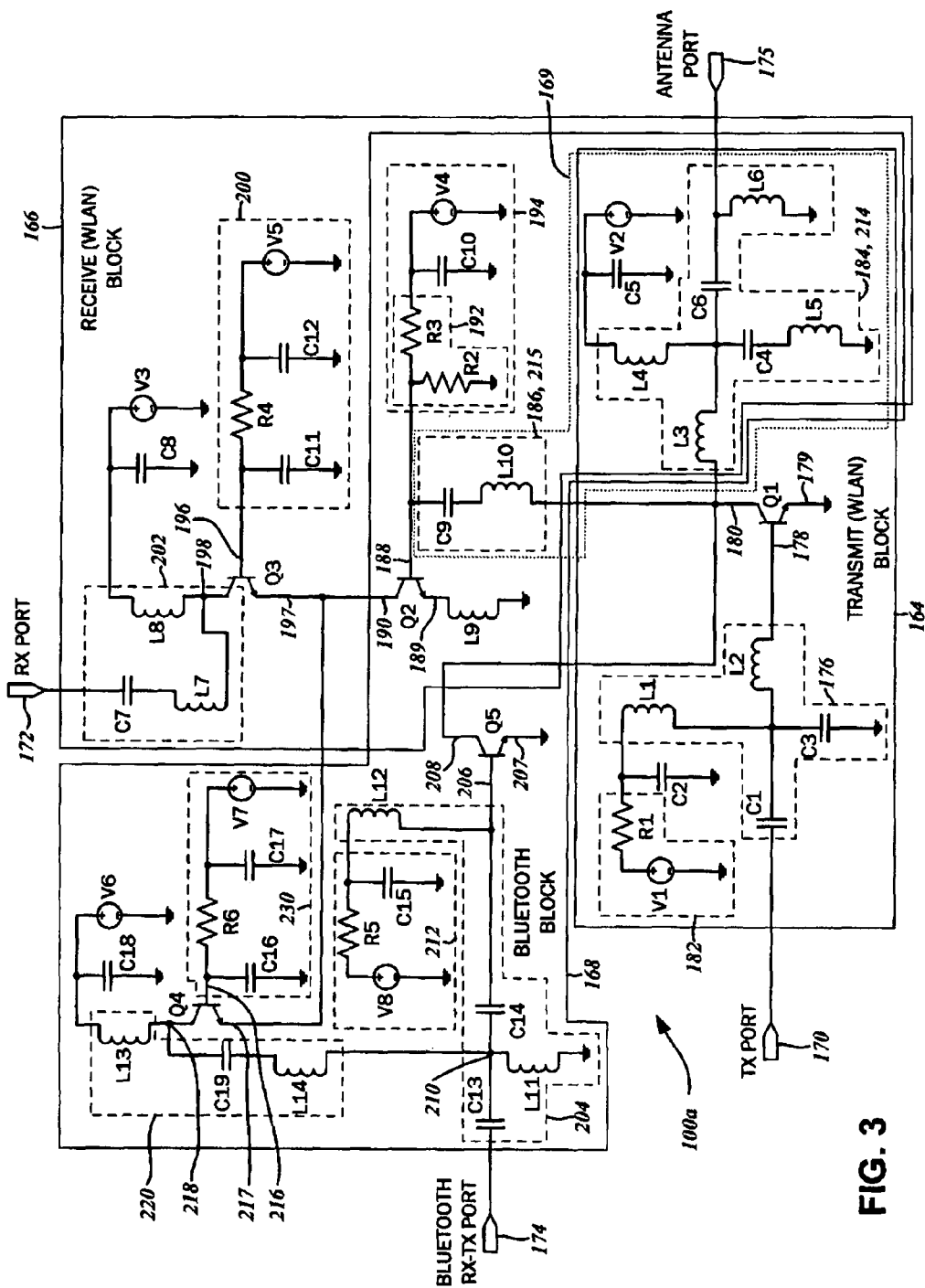
FIG. 3 is a schematic diagram of a first embodiment of the front end circuit.

With reference to the circuit diagram of FIG. 3, a first embodiment of the front end circuit 100a is generally defined by a WLAN transmit block 164, a WLAN receive block 166, and a combined Bluetooth block 168. The various subparts thereof are understood to correspond to the aforementioned power amplifiers 110, 112, low noise amplifiers 114, 116, and the matching networks 132, 134, and 136, as will be detailed more fully below. The WLAN transmit block 164 includes a TX (transmit) port 170 that is connected to the WLAN transmit line 118, and the WLAN receive block 166 includes an RX (receive) port 172 that is connected to the WLAN receive line 120. Additionally, the Bluetooth block 168 includes a shared TX/RX port 174 that is connected to the common transmit and receive line 126 of the Bluetooth transceiver 108. The front end circuit 100a also includes an antenna port 175 associated with each of the WLAN transmit block 164, the WLAN receive block 166, and the combined Bluetooth block 168. There is also an antenna matching block 169 that generally correspond to the matching networks 134 and 136, and accordingly share various components of the WLAN transmit block 164, the WLAN receive block 166, and the combined Bluetooth block 168.

In further detail, the WLAN transmit block 164 has a single-stage power amplifier with a transistor Q1 in a common emitter configuration. It is understood that multi-stage amplifiers may also be utilized for higher gain applications, and those having ordinary skill in the art will recognize the appropriate modifications to the basic configuration presented herein for such multi-stage amplifiers. In some embodiments, it is contemplated that the transistor Q1 has a bipolar junction structure, though in some embodiments, they may have a field-effect structure (MOSFET, MESFET, and the like). In this regard, while the present disclosure variously references bases, collectors, and emitters of bipolar junction transistors, it is to be understood that such elements directly correspond to the gates, drains, and sources of field effect transistors.

As briefly noted above, the WLAN power amplifier 110 includes circuitry for matching the input of the front end circuit 100 to the 50-Ohm output impedance of the WLAN transceiver 106 at the predefined operating frequency, as is common in most RF systems. The components of a power amplifier input matching network 176 include capacitors C1 and C3, as well as inductors L1 and L2, which match the WLAN transmit port 170 to a base 178 of the transistor Q1 while it is being turned on and off in the predefined operating frequency range. The capacitor C1 is tied to the transmit port 170, the capacitor C3, and the inductors L1 and L2. The inductor L2 is tied to the base 178, and the capacitor C3 is tied to ground. The WLAN power amplifier input matching network 176 may be variously configured according to different gain, linearity, and wideband operation requirements.

Tied to the inductor L1 is an adjustable voltage source V1 that sets the bias point of the transistor Q1 of the WLAN power amplifier 110 through a resistor R1. The bias conditions, in conjunction with the size or geometry of the transistor Q1, are chosen to maximize the operating power level at the antenna 102 during transmission. Additionally, an RF decoupling capacitor C2 having a sufficiently high capacitance is connected to the voltage source V1. These components are understood to comprise one embodiment of a first transmit control circuit 182 that is coupled to the first general purpose input/output line 122 of the WLAN transceiver 106. As indicated above, a variable voltage may be generated intermittently by the WLAN transceiver 106 on the first general purpose input/output line 122 and thus the transistor Q1, that is, the WLAN power amplifier 110 is activated and deactivated. The first transmit control circuit 182 is not intended to be limited to voltage supply circuits as considered above, and any other suitable supply such as a current minor architecture may be readily substituted.

The WLAN transmit block 164, and specifically the collector 180 of the transistor Q1, is connected to the antenna matching block 169 that generally corresponds to the matching networks 134, 136. The antenna matching block 169 is defined by a WLAN power amplifier output matching segment 184 that includes inductors L3, L4, L5 and L6, as well as capacitors C4 and C6. The WLAN power amplifier output matching segment 184 impedance matches the transistor Q1 to the antenna 102 at the predefined operating frequency when active. The collector 180 of the transistor Q1 is connected to the inductor L3, which in turn is connected to capacitors C4, C6, and the inductor L4. The values of the capacitor C4 and the inductor L5 connected in series thereto and to ground are selected to provide a series resonance at the second harmonic of the predefined operating frequency. A voltage source V2 is connected to the inductor L4, and provides biasing to the collector 180 of the transistor Q1. It is contemplated that the voltage source V2 is provided by battery or other appropriate device independent of the other control lines referenced herein. Similar to the voltage source V1, an RF decoupling capacitor C5 is connected between the voltage source V2 and ground.

In accordance with various embodiments, the inductor L6 has an electrostatic discharge function. The resistive component of the inductor L6 is contemplated to have a value less than 5 Ohm to provide a direct current (DC) pass from the antenna port 175 to ground in case a high voltage is accidentally applied. Accordingly, the need for electronic discharge clamp circuitry that degrades signal transmission performance, as is typical in silicon substrate-based semiconductor devices, is eliminated.

The WLAN power amplifier output matching segment 184 is configured in a way that the resistive part of the impedance at the collector 180 of the transistor Q1 is equal or below the resistive component of an output impedance or transistor load impedance required for the activated transistor Q1 that corresponds to a predetermined 1 dB compression point (P1 dB) at a specific bias voltage. In this regard, the WLAN power amplifier output matching segment 184 is loaded at the antenna side by a predefined load (typically 50 Ohms) while the WLAN receive block 166, including a WLAN low noise amplifier input matching segment 186, is disconnected.

The WLAN low noise amplifier input matching segment 186 is comprised of a capacitor C9 and an inductor L10 that are exclusive thereto. The WLAN low noise amplifier input matching segment 186 is combined with the inductors L3, L4, L5 and L6 and capacitors C4 and C6, which are shared with the WLAN power amplifier output matching segment 184, to impedance match the WLAN low noise amplifier 114 to the antenna 102 while active. The capacitor C9 and the inductor L10 are connected in series to the collector of the transistor Q1 and a base 188 of a shared low noise amplifier transistor Q2.

A number of factors are applicable to the optimal configuration of the WLAN low noise amplifier input matching segment 186. In particular, the size or geometry of the shared low noise amplifier transistor Q2 is selected such that the resistive component of an input impedance of an activated shared low noise amplifier transistor Q2 is substantially similar to the resistive component of an output impedance required for the activated transistor Q1 of the power amplifier 110. The values of the capacitor C9 and the inductor L10 are selected to reach a minimal noise figure (NF) between the antenna 102 and the output of the WLAN low noise amplifier 114, as well as a minimal input return loss for an activated shared low noise amplifier transistor Q2 and a deactivated transistor Q1 of the power amplifier 110. A suitable NF, according to one embodiment, may be less than 3 dB. The input return loss is understood to be measured from the antenna 102, and includes the receive chain of the antenna matching block 169, i.e., the shared power amplifier output matching segment 184 and the low noise amplifier input matching segment 186. One embodiment contemplates an input return loss of less than −10 dB.

The capacitor C9 and the inductor L10 are selected to correspond to a substantially minimized voltage swing at the base of the transistor Q2. As mentioned previously, when the WLAN power amplifier 110 is on, an optimized configuration minimizes the voltage being applied to the WLAN low noise amplifier 114 to prevent the transistor Q2 from conducting while the base-emitter resistance decreases, thereby degrading the transmitted RF signal.

Generally, the smallest value of the capacitor C9 is understood to result in the minimum voltage amplitude at the base-emitter junction of the transistor Q2 when the transistor Q1 is on and the transistor Q2 is off, thus increasing its reliability. Additionally, linearity of the power amplifier 110 is achieved at higher transmit power levels. Avoiding a resonance frequency of the WLAN low noise amplifier input matching segment 186 close to the predefined operating frequency also decreases voltage swing at the base-emitter junction of the deactivated transistor Q2, so in one exemplary configuration, the resonance frequency is set to be at least a few hundred MHz higher.

As indicated above, the antenna matching block 169 is connected to the WLAN receive block 166, which includes the low noise amplifier 114 and other associated circuitry. The transistor Q2 is one of the transistors associated with the WLAN low noise amplifier 114, and is also in a common-emitter configuration. Additionally connected to the emitter 189 of the shared low noise amplifier transistor Q2 is an optional degeneration inductor L9 that is tied to ground. In some cases, the base-emitter impedance of the shared low noise amplifier transistor Q2 may be better matched to the antenna 102.

An adjustable voltage source V4 is also connected to the base 188 of the shared low noise amplifier transistor Q2 for activating and setting its bias point. As previously noted, a variable voltage may be generated intermittently by the WLAN transceiver 106 on the second general purpose input/output line 124 and so the WLAN low noise amplifier 114 is activated and deactivated thereby. The voltage is provided through a resistive divider 192 that includes a resistor R3 connected to the adjustable voltage source V4 and a resistor R2 connected to ground and the resistor R3. The junction between the resistor R2 and the resistor R3 is tied to the base 188 of the shared low noise amplifier transistor Q2. The resistive divider 192 is configured to have a sufficient resistance to prevent shunting of the impedance at the base 188 of the transistor Q2, that is, the base-emitter resistance of the activated shared low noise amplifier transistor Q2 is less than that of the resistive divider 192. An RF decoupling capacitor C10 is also connected to the voltage source V4. These components are understood to comprise one embodiment of a shared receive control circuit 194. As with the first transmit control circuit 182, the shared receive control circuit 194 is not intended to be limited to a voltage supply as above, and other configurations such as a current minor are also suitable.

The WLAN receive block 166 also includes a first cascode transistor Q3 that is specific thereto. In further detail, an emitter 197 of the first cascode transistor Q3 is connected to the collector of the shared low noise amplifier transistor Q2. A collector 198 of the first cascode transistor Q3 is connected to the bias supply voltage source V3 with an inductor L8. As with the other embodiments, an RF decoupling capacitor C8 is connected to the adjustable voltage source V3. A base 196 of the first cascode transistor Q3 is coupled to an adjustable voltage source V5, which, according to one contemplated embodiment, is the second general purpose input/output line 124 that provides a suitable voltage to settle the bias point of the first cascode transistor Q3. Accordingly, whenever the first cascode transistor Q3 is activated, so is the shared low noise amplifier transistor Q2. A resistor R4 adjusts the voltage to the base 196 to provide a suitable current through the shared low noise amplifier transistor Q2 and the first cascode transistor Q3. The geometry of the first cascode transistor Q3 is likewise selected with this objective. There is also a RF decoupling capacitor C12, along with a capacitor C11 for stabilization and for setting an appropriate gain shape over a wide frequency range. These components are understood to comprise one embodiment of a first receive control circuit.

The collector 198 of the transistor Q3 is connected to a WLAN low noise amplifier output matching network 202, which includes inductors L7 and L8, a capacitor C7. The WLAN low noise amplifier output matching network 202 is configured to match the impedance of the WLAN RX port 172, which is typically 50 Ohms, at the predefined operating frequency. A variety of configurations with respect to the WLAN low noise amplifier output matching circuit 202 are possible depending upon the gain, noise figure, linearity, and wide-band operation requirements.

According to an embodiment of the present invention, the combined Bluetooth block 168 is comprised of a Bluetooth power amplifier 112 and a Bluetooth low noise amplifier 116, a first matching network 132 and a second matching network 134. The Bluetooth power amplifier 112 is comprised of a transistor Q5 in a common emitter configuration. It is understood that multi-stage amplifiers may also be utilized for higher gain applications, and those having ordinary skill in the art will recognize the appropriate modifications to the basic configuration presented herein for such multi-stage amplifiers. Because the Bluetooth transmission require less power, the transistor Q5 may have a smaller geometry compared to the corresponding transistor Q1 of the WLAN power amplifier 110.

The first matching network 132 includes circuitry for matching the input of the front end circuit 100 to the 50-Ohm output impedance of the Bluetooth transceiver 108 at the predefined operating frequency. The components of the first matching network 132, that is, the power amplifier input matching circuit 204, includes capacitor C13 and C14, and inductors L11 and L12, which match the Bluetooth shared transmit/receive port 174 to a base 206 of the transistor Q5 while it is being turned on and off in the predefined operating frequency range. In further detail, the capacitor C13 is connected to the shared transmit/receive port 174, the inductor L11, which is tied to ground, and the capacitor C14, which is tied to the base 206 of the transistor Q5. The junction between the capacitor C13, C14, and the inductor L11 defines a common point 210.

The inductor L12 is tied to the base 206 of the transistor Q5 and an adjustable voltage source V8. The adjustable voltage source V8 sets the bias point of the transistor Q5 and defines a second transmit control circuit 212 that is coupled to the first general purpose input/output line 128 of the Bluetooth transceiver 108. A variable voltage may be generated intermittently by the Bluetooth transceiver 108 to activate and deactivate the transistor Q5.

The inductor L12 is selected to have a reactive impedance value that is substantially lower, or about 5 to 10 times lower, than the base-emitter impedance of the transistor Q5 when it is off. Furthermore, the inductor is also selected to have a reactive impedance value that is greater than three times or lower than three times the base-emitter reactive impedance of the transistor Q5 when a second cascode transistor Q4 is off. It is understood that these values are selected to prevent a parallel resonant circuit from activating when the transistor Q5 is turned off.

The capacitor C14, in turn, has a value selected to avoid resonance with the inductor L12 in the predefined operating frequency. It is contemplated that the capacitor C14 is selected to be as small as possible, so that there is a capacitive voltage divider at the base 206 of the transistor Q5 when off, particularly where a large signal at the Bluetooth low noise amplifier 116 is required. This is also understood to prevent the Q5 from conducting and destroying linearity of the received signal.

The Bluetooth power amplifier 112, via the collector 208 of the transistor Q5, is connected to the antenna matching block 169. As indicated above, the antenna matching block 169 is defined by the Bluetooth power amplifier output matching segment 214 that is the same as the WLAN power amplifier output matching segment 184. The Bluetooth power amplifier output matching segment 214 impedance matches the transistor Q5 to the antenna 102 at the predefined operating frequency when active.

The Bluetooth low noise amplifier 116 includes a second cascode transistor Q4 that is specific to the Bluetooth block 168. In further detail, an emitter 217 of the second cascode transistor Q4 is connected to the collector of the shared low noise amplifier transistor Q2. A collector 218 of the second cascode transistor Q4 is connected to the bias supply voltage source V6 with an inductor L13, and an RF decoupling capacitor C18 is connected to the voltage source V6. A base 216 of the second cascode transistor Q4 is coupled to an adjustable voltage source V7, which, according to one contemplated embodiment, is the second general purpose input/output line 130 that provides a suitable voltage to settle the bias point of the second cascode transistor Q4.

Consequently, whenever the second cascode transistor Q4 is activated, so is the shared low noise amplifier transistor Q2. The shared low noise amplifier Q2 is thus activated whenever either one of the first or second cascode transistors Q3 or Q4 are activated. Although in most circumstances, the first and second cascode transistors Q3 and Q4 are not simultaneously activated, the possibility of such an operational mode is also contemplated. When one of the first or second cascode transistors Q3 or Q4 is activated and the other is not, the deactivated one has a miniscule influence on the activated one as it has a high impedance between the respective collectors 198, 218 and ground.

Continuing with the Bluetooth low noise amplifier 116, a resistor R6 adjusts the voltage to the base 216 to provide a suitable current through the shared low noise amplifier transistor Q2 and the second cascode transistor Q4. The geometry of the second cascode transistor Q4 is likewise selected with this objective. There is also a RF decoupling capacitor C17, along with a capacitor C16 for stabilization and for setting an appropriate gain shape over a wide frequency range. These components are understood to comprise one embodiment of a second receive control circuit 230.

The Bluetooth low noise amplifier 116 is connected to the antenna matching block 169 as noted above. The antenna matching block 169 is defined by a Bluetooth low noise amplifier input matching segment 215, which is the same as the WLAN low noise amplifier input matching segment 186 that is comprised of the inductor L10 and the capacitor C9, which together with the Bluetooth power amplifier output matching segment 214, impedance matches the Bluetooth low noise amplifier 116 to the antenna 102. Because of this, the first and second cascode transistors Q3 and Q4 may be selected to have the same geometry.

The collector 218 of the second cascode transistor Q4 is connected to a Bluetooth low noise amplifier output matching network 220, the output of which is connected to the common point 210. The collector 218 is also connected to a bias voltage source V6, and like all other voltage sources, includes an RF decoupling capacitor C18. When the shared low noise amplifier transistor Q2 and the second cascode transistor Q4 is deactivated, the Bluetooth low noise amplifier output matching network 220 is configured not to influence the impedance at the base 206 of the transistor Q5.

The Bluetooth low noise amplifier output matching network 220 is comprised of an inductor L13 and a capacitor C19 that are tied to the collector 218 of the second cascode transistor Q4, and an inductor L14 connected in series with the capacitor C19 to the common point 210. The inductors L13, L14 and the capacitor C19 are selected such that an overall impedance matches the overall impedance of the series chain of inductor L11 and the capacitor C13 in the predefined operating frequency. In this regard, the deactivated transistor Q5 has a miniscule influence on the performance characteristics of the Bluetooth low noise amplifier 116, that is, the combination of the shared low noise amplifier transistor Q2 and the second cascode transistor Q4. Relatedly, the inductors L13, L14 and the capacitor C19 may have values such that its overall impedance is 3 to 5 times higher than an overall impedance at the common point 210.

The various operational states noted above will now be considered in light of the detailed features of the front end circuit 100a. In the WLAN transmit state, the transistor Q1 is activated with an appropriate enable signal being applied to the first transmit control circuit 182. The transistors Q2, Q3, Q4, and Q5 are off. The RF signal generated at the WLAN transmit line 118 is amplified by the transistor Q1 and transmitted via the antenna 102. In the WLAN receive state, the shared low noise amplifier transistor Q2 and the first cascode transistor Q3 are activated, with an appropriate voltage applied to the shared receive control circuit 194 and the first receive control circuit 200. The transistors Q1, Q4, and Q5 are off, and the RF signal received by the antenna 102 is amplified by the cascode WLAN low noise amplifier 114 (primarily transistors Q2 and Q3) and passed to the WLAN receive line 120. In the Bluetooth transmit state, the transistor Q5 is activated, with an appropriate voltage being applied to the second transmit control circuit 212. The transistors Q1, Q2, Q3 and Q4 are off, and the RF signal generated by the Bluetooth transceiver 108 on the shared transmit and receive line 126 is amplified by Q5 and transmitted via the antenna 102. In the Bluetooth receive state, the transistors Q2 and Q4 are activated, with an appropriate voltage applied to the shared receive control circuit 194 and the second receive control circuit 230. The transistors Q1, Q3 and Q5 are off. The RF signal received by the antenna 102 is amplified by the cascode Bluetooth low noise amplifier 116, which includes the transistors Q2 and Q4, and passed to the shared transmit and receive line 126. In a simultaneous WLAN/Bluetooth transmit state, the transistors Q1 and Q5 are both activated with voltages applied to the first transmit control circuit 182 and the second transmit control circuit 212. The transistors Q2, Q3, and Q4 remain off. In a simultaneous WLAN/Bluetooth receive state, the transistors Q2, Q3, and Q4 are activated with voltages applied to the shared receive control circuit 194, the first receive control circuit 200, and the second receive control circuit 230. The power amplifier transistors Q1 and Q5 are deactivated.

Figure 4:
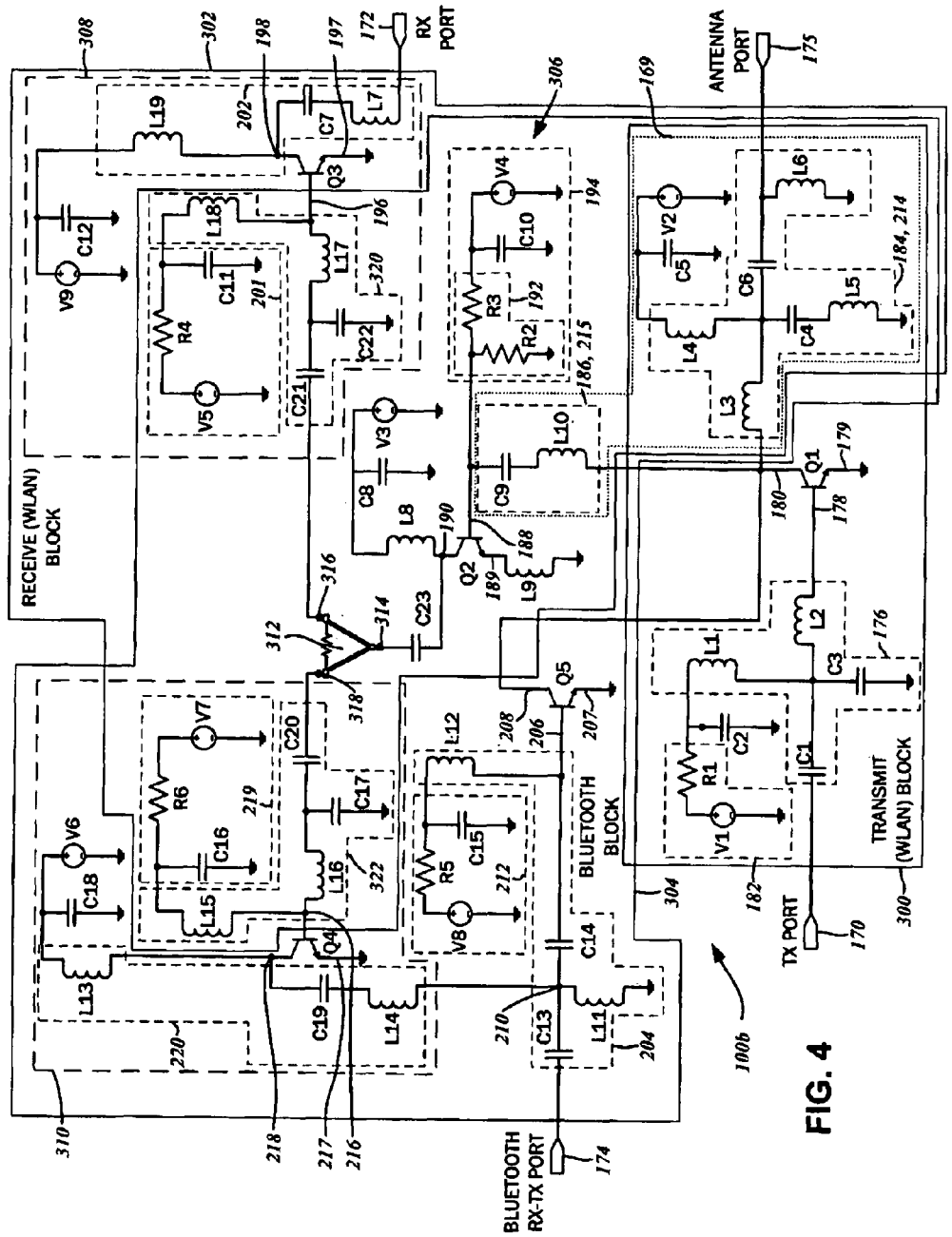
FIG. 4 is a schematic diagram of a second embodiment of the front end circuit including a multi-stage matching network with a power divider.

With reference to the circuit diagram of FIG. 4, a second embodiment of the front end circuit 100b is generally defined by a WLAN transmit block 300, a WLAN receive block 302, and a combined Bluetooth block 304. The various subparts thereof are understood to correspond to the aforementioned power amplifiers 110, 112, low noise amplifiers 114, 116, and the matching networks 132, 134, and 136, as will be detailed more fully below. The WLAN transmit block 300 includes the TX (transmit) port 170 that is connected to the WLAN transmit line 118, and the WLAN receive block 302 includes an RX (receive) port 172 that is connected to the WLAN receive line 120. Additionally, the Bluetooth block 304 includes the shared TX/RX port 174 that is connected to the common transmit and receive line 126 of the Bluetooth transceiver 108. The front end circuit 100b also includes an antenna port 175 associated with each of the WLAN transmit block 300, the WLAN receive block 302, and the combined Bluetooth block 304. The antenna matching block 169, described more fully above, is understood to generally correspond to the matching networks 134 and 136 and share various components of the WLAN transmit block 300, the WLAN receive block 302, and the combined Bluetooth block 304.

As a general matter, many of the components of the WLAN transmit block 300, the WLAN receive block 302, and the Bluetooth block 304 are shared with the WLAN transmit block 164, the WLAN receive block 166, and the Bluetooth block 168, respectively, of the first embodiment of the front end circuit 100a described above with reference to FIG. 3. However, as will be described in further detail below, various modifications to the WLAN low noise amplifier 114 and the Bluetooth low noise amplifier 116 are contemplated. In particular, the power divider 312 is not utilized, and instead, inter-stage matching circuits are substituted to reduce overall die size. However, the WLAN low noise amplifier 114 and the Bluetooth low noise amplifier 116 have a multi-stage architecture as in the first embodiment of the front end circuit 100a.

The WLAN transmit block 300 has a single-stage power amplifier with the transistor Q1 in a common emitter configuration as previously indicated. The transistor Q1 is matched to the WLAN transmit port 170 with the WLAN power amplifier input matching network 176. The first transmit control circuit 182 sets the bias point and activates the transistor Q1. Additionally, the WLAN transmit block 300 is connected to the antenna matching block 169, which is defined by a WLAN power amplifier output matching segment 184 that impedance matches the transistor Q1 to the antenna 102 at the predefined operating frequency when active.

The Bluetooth block 304 also has a single-stage power amplifier with the transistor Q5 in a common emitter configuration. The transistor Q5 is matched to the Bluetooth common transmit and receive line 126 with the Bluetooth power amplifier input matching circuit 204. The second transmit control circuit 212 activates and deactivates the transistor Q5 with a voltage applied thereto. The output matching for the transistor Q5 is provided by the antenna matching block 169, which is the same as that for the WLAN transmit block 300.

The WLAN receive block 302 includes the WLAN low noise amplifier input matching segment 186 that is combined with the WLAN power amplifier output matching segment 184, to impedance match the WLAN low noise amplifier 114 to the antenna 102 while active. Along these lines, the Bluetooth block 304 includes the Bluetooth low noise amplifier input matching segment 215, which is the same as the WLAN low noise amplifier input matching segment 186, is combined with the Bluetooth power amplifier output matching segment 214 to impedance match the antenna 102 and the Bluetooth low noise amplifier 116.

The WLAN receive block 302 and the Bluetooth block 304 together define a combined low noise amplifier base stage 306 comprised of the shared low noise amplifier transistor Q2 in a common-emitter configuration. The base 188 of the shared low noise amplifier transistor Q2 is coupled to the WLAN and Bluetooth low noise amplifier input matching segment 186, 215, as well as the shared receive control circuit 194. As previously described, the voltage source V4 is understood to be tied to the second general purpose input/output line 124 of the WLAN transceiver 106 as well as the second general purpose input/output line 130 of the Bluetooth transceiver 108, and in either receive mode, the shared low noise amplifier transistor Q2 is activated. A voltage source V3 biases the collector 190 of the shared low noise amplifier transistor Q2, and there is included an RF decoupling capacitor C8. The collector 190 is coupled to the inductor L8 and a capacitor C23, which are understood to be an inter-stage matching circuit.

In this regard, the combined low noise amplifier base stage 306 is connected to a first low noise amplifier stage 308 specific to the WLAN low noise amplifier 114, and a second low noise amplifier stage 310 specific to the Bluetooth low noise amplifier 116 over a power divider 312. In further detail, the power divider 312 includes a first port 314 connected to the combined low noise amplifier base stage 306, that is, the capacitor C23. Additionally, the power divider 312 includes a second port 316 and a third port 318. The values of the inductor L8 and the capacitor C23 are selected such that there is a substantially resistive impedance in the predefined operating frequency at the first node 314. Furthermore, the resistive impedance at the first node 314 is selected to minimize the resistive part of the impedance at the collector 190 of the shared low noise amplifier transistor Q2, thereby increasing 1 dB gain compression to sustain large blocking RF signals.

It is contemplated that the power divider 312 has a number of characteristics. For instance, the first, second and third ports 314, 316, and 318 are understood to have substantially resistive impedances in the predefined operating frequency. Further, the power loss between the first, second, and third ports 314, 316, and 318 is minimized, and the isolation between the second and third ports 316, 318 is maximized where the first port 314 is perfectly matched. As a general matter, the power divider 312 is configured to split the power applied to the first port 314 to two equal power levels at the second port 316 and the third port 318. Due to some losses, the power at the second port 316 and the third port 318 are understood to be approximately 3 dB less than that applied at the first port 314. Furthermore, the impedance at the first port 314 is understood to be two times lower than that at the second port 316 or the third port 318. The power divider 312 may have different architectures known in the art, and those having ordinary skill will be able to readily ascertain and substitute such architectures. These include Wilkinson-type, lumped-element based, coupled inductor based, and so forth.

The first low noise amplifier stage 308 includes the transistor Q3 that is in a common-emitter configuration. The collector 198 is tied to a bias voltage source V9 through an inductor L19, which is part of the WLAN low noise amplifier output matching circuit 202 in combination with the capacitor C7 and the inductor L7. The WLAN low noise amplifier output matching circuit 202 is connected to the WLAN receive port 172 and impedance matches the transistor Q3 thereto. Additionally, the RF decoupling capacitor C12 is tied to the voltage source V9. Another embodiment of the first receive control circuit 201 includes the adjustable voltage source V5 that is connected to the second general purpose input/output line 124 to provide a suitable voltage to settle the bias point of the transistor Q3. The first receive control circuit 201 is comprised of the resistor R4 and the inductor L18, as well as the RF decoupling capacitor C11.

The first low noise amplifier stage 308 is further comprised of a first low noise amplifier input matching circuit 320 that is connected to the second port 316 of the power divider 312. More particularly, the matching circuit 320 is comprised of capacitors C21 and C22, and inductors L17 and L18 to match the impedance at the second port 316 and the impedance of the base-emitter junction of the transistor Q3 when activated. As indicated above, a high isolation between the second port 316 and the third port 318 is understood to minimize the influence of the transistor Q4.

The second low noise amplifier stage 310 is based on the transistor Q4, also in a common-emitter configuration. The collector 218 of the transistor Q4 is tied to the bias voltage source V6 through the inductor L13, and together with the capacitor C19 and the inductor L14, define the Bluetooth low noise amplifier output matching circuit 220 that is connected to the common point of the Bluetooth power amplifier input matching circuit 204. The bias voltage source V6 is also connected to the RF decoupling capacitor C18. A different embodiment of the second receive control circuit 219 includes the adjustable voltage source V7 that is connected to the second general purpose input/output line 130 to settle the bias point of the transistor Q4. The second receive control circuit 219 also includes the RF decoupling capacitor C16.

The second low noise amplifier stage 310 is further comprised of a second low noise amplifier input matching circuit 322 connected to the third port 318 of the power divider 312. The matching circuit 322 is comprised of capacitors C20, C17 and inductors L15 and L16 to match the impedance at the third port 318 and the impedance of the base-emitter junction of the transistor Q4 when activated. Again, the high isolation between the second port 316 and the third port 318 is understood to minimize the influence of the transistor Q3.

Generally, the various operational states of the transistors Q1, Q2, Q3, Q4 and Q5 in the second embodiment of the front end circuit 100b are understood to be the same as set forth in relation to the first embodiment of the front end circuit 100a. The particular configurations of the circuits in the front end circuit 100b are presented by way of example only and not of limitation. For example, with respect to the first and second low noise amplifier input matching circuits 320, 322, it will be appreciated by those having ordinary skill in the art that any other suitable architectures and bias conditions may be substituted.

Figure 5:
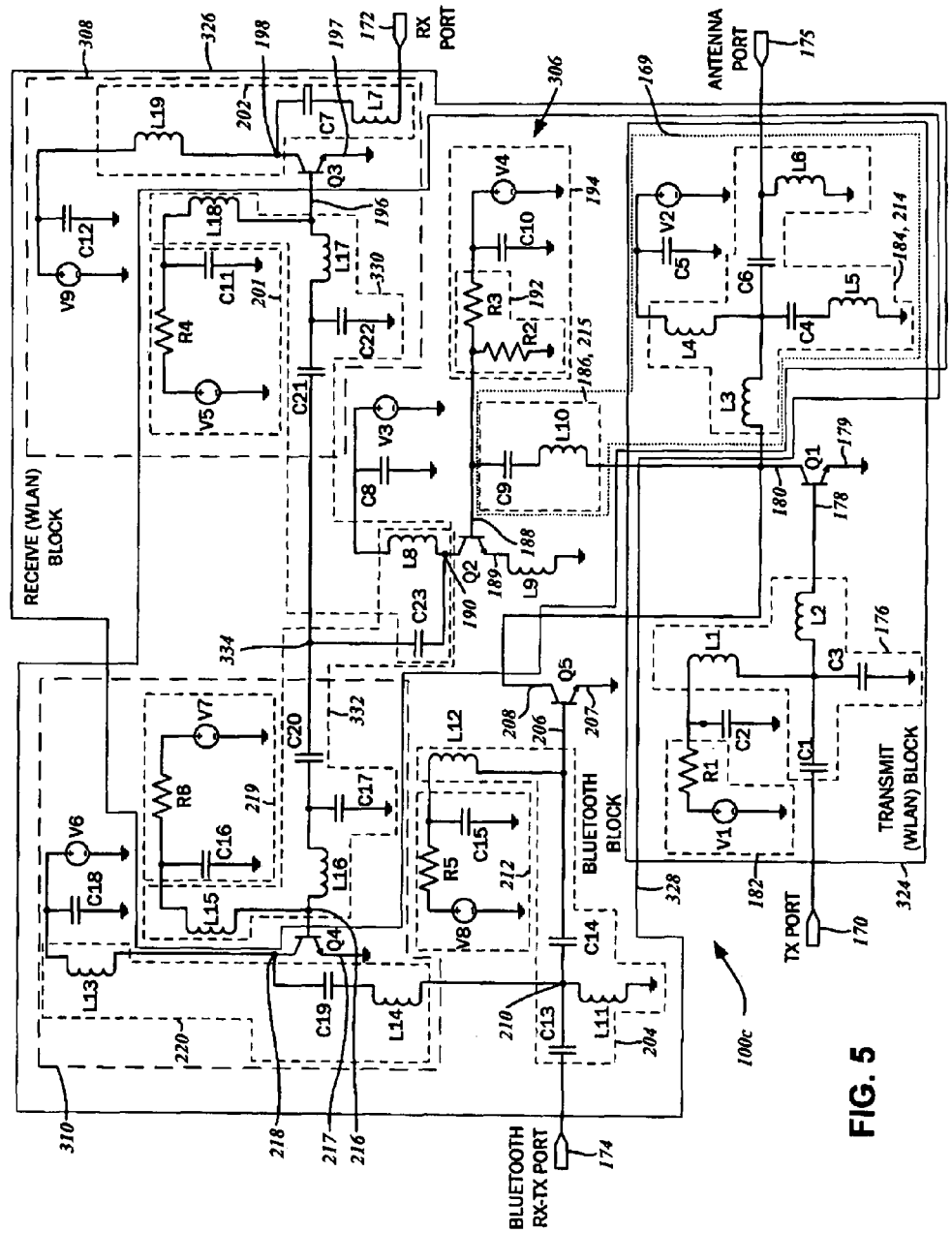
FIG. 5 is a schematic diagram of a third embodiment of the front end circuit including a multi-stage matching network with inter-stage matching circuits.

Referring now to the schematic diagram of FIG. 5, a third embodiment of the front end circuit 100c is defined by a WLAN transmit block 324, a WLAN receive block 326, and a combined Bluetooth block 328. The various subparts thereof are understood to correspond to the power amplifiers 110, 112, low noise amplifiers 114, 116, and the matching networks 132, 134, and 136, as will be detailed more fully below. The WLAN transmit block 324 includes the TX (transmit) port 170 that is connected to the WLAN transmit line 118, and the WLAN receive block 326 includes an RX (receive) port 172 that is connected to the WLAN receive line 120. Additionally, the Bluetooth block 328 includes the shared TX/RX port 174 that is connected to the common transmit and receive line 126 of the Bluetooth transceiver 108. The front end circuit 100c also includes an antenna port 175 associated with each of the WLAN transmit block 324, the WLAN receive block 326, and the combined Bluetooth block 328. The antenna matching block 169, described more fully above, is understood to generally correspond to the matching networks 134 and 136 and share various components of the WLAN transmit block 324, the WLAN receive block 326, and the combined Bluetooth block 328.

As indicated above, many of the components of the WLAN transmit block 324, the WLAN receive block 326, and the Bluetooth block 328 are shared with the WLAN transmit block 300, the WLAN receive block 302, and the Bluetooth block 304, respectively, of the front end circuit 100b described above. However, different architectures of the WLAN low noise amplifier 114 and the Bluetooth low noise amplifier 116 are contemplated.

The WLAN transmit block 324 has a single-stage power amplifier with the transistor Q1 in a common emitter configuration as previously indicated. The transistor Q1 is matched to the WLAN transmit port 170 with the WLAN power amplifier input matching network 176. The first transmit control circuit 182 sets the bias point and activates the transistor Q1. Additionally, the WLAN transmit block 324 is connected to the antenna matching block 169, which is defined by a WLAN power amplifier output matching segment 184 that impedance matches the transistor Q1 to the antenna 102 at the predefined operating frequency when active.

The Bluetooth block 328 also has a single-stage power amplifier with the transistor Q5 in a common emitter configuration. The transistor Q5 is matched to the Bluetooth common transmit and receive line 126 with the Bluetooth power amplifier input matching circuit 204. The second transmit control circuit 212 activates and deactivates the transistor Q5 with a voltage applied thereto. The output matching for the transistor Q5 is provided by the antenna matching block 169, which is the same as that for the WLAN transmit block 324.

The WLAN receive block 326 includes the WLAN low noise amplifier input matching segment 186 that is combined with the WLAN power amplifier output matching segment 184, to impedance match the WLAN low noise amplifier 114 to the antenna 102 while active. Furthermore, the Bluetooth block 328 includes the Bluetooth low noise amplifier input matching segment 215, which is the same as the WLAN low noise amplifier input matching segment 186, is combined with the Bluetooth power amplifier output matching segment 214 to impedance match the antenna 102 and the Bluetooth low noise amplifier 116.

The WLAN receive block 326 and the Bluetooth block 328 together defines the combined low noise amplifier base stage 306, which includes the shared low noise amplifier transistor Q2 in a common-emitter configuration. The base 188 of the shared low noise amplifier transistor Q2 is coupled to the WLAN and Bluetooth low noise amplifier input matching segment 186, 215, as well as the shared receive control circuit 194. The voltage source V4 is tied to the second general purpose input/output line 124 of the WLAN transceiver 106 as well as the second general purpose input/output line 130 of the Bluetooth transceiver 108, and in either receive mode, the shared low noise amplifier transistor Q2 is activated. The voltage source V3 biases the collector 190 of the shared low noise amplifier transistor Q2, and is also connected to the RF decoupling capacitor C8. The collector 190 is coupled to the inductor L8 and a capacitor C23, which are part of a first inter-stage matching circuit 330, and as will be described more below, a second inter-stage matching circuit 332.

As indicated above, the first low noise amplifier stage 308 includes the transistor Q3 that is in a common-emitter configuration, as well as the first receive control circuit 201 that activates the transistor Q3. The WLAN low noise amplifier output matching circuit 202 is also a part of the first low noise amplifier stage 308, and impedance matches the transistor Q3 to the WLAN receive port 172. Along these lines, the second low noise amplifier stage 310 includes the transistor Q4 that is also in a common-emitter configuration, and the second receive control circuit 219 that activates the transistor Q4. The Bluetooth low noise amplifier output matching circuit 220 that is part of the second low noise amplifier stage 310 is connected to the common point 210 defined by the Bluetooth power amplifier input matching circuit 204. Although the exemplary first and second receive control circuits 201, 219 are based upon a voltage supply, it will be appreciated by those having ordinary skill in the art that any other architecture such as a current mirror may be substituted.

The first inter-stage matching circuit 330 couples the combined low noise amplifier base stage 306 to the first low noise amplifier stage 308. In further detail, the first inter-stage matching circuit 330 includes inductors L8, L17, and L18, as well as capacitors C23, C21, and C22. The second inter-stage matching circuit 332 couples the combined low noise amplifier base stage 306 to the second low noise amplifier stage 310. The second inter-stage matching circuit 332 includes the inductors L8, L15, and L16, and capacitors C23, C20, and C17. The inductor L8 and the capacitor C23 may be further referenced as the combined low noise amplifier base stage output matching segment, and have values that achieve a substantially low resistive impedance in the predefined operating frequency at the collector 190 of the transistor Q2 when on. It is understood that the base-emitter impedance of the transistors Q3 and Q4 has a high value, that is, greater than 1 k Ohm, when off, but has a low value, that is, less than 100 Ohm when on.

In accordance with an embodiment of the present invention, the values of the specific components of the first inter-stage matching circuit 330 are selected with certain directives. By way of example only and not of limitation, the value of the inductor L18 is selected such that its reactive impedance is at least 3 to 5 times lower than the reactive impedance of the base-emitter resistance of the transistor Q3 when off. In this regard, the inductor L18 in series with the inductor L17 results in a parallel resonant circuit with the capacitor C22. Furthermore, the inductor L17 and the capacitor C22 are selected to obtain a resonance frequency equal or close to the predefined operating frequency. The capacitor C21 is selected such that there is a substantially resistive impedance at a low noise amplifier common point 334 when the transistor Q3 is activated.

Relatedly, the values of the specific components of the second inter-stage matching circuit 332 are selected with similar, corresponding directives. The value of the inductor L15 is selected such that its reactive impedance is at least 3 to 5 times lower than the reactive impedance of the base-emitter resistance of the transistor Q4 when off. The inductor L15 in series with the inductor L16 is understood to result in a parallel resonant circuit with the capacitor C17. The inductor L16 and the capacitor C17 are selected to obtain a resonance frequency equal or close to the predefined operating frequency. The capacitor C20 is selected such that there is a substantially resistive impedance at a low noise amplifier common point 334 when the transistor Q4 is activated.

The foregoing configuration is contemplated to isolate the transistor Q3 from the transistor Q4. Specifically, when the transistors Q2 and Q3 are on and the transistor Q4 is off, the low noise amplifier common point 334 has a high impedance looking into the transistor Q4. Thus, the transistor Q4 is understood not to affect the performance of the activated WLAN low noise amplifier 114. Furthermore, when the transistors Q2 and Q4 are on and the transistor Q3 is off, the low noise amplifier common point 334 has a high impedance looking into the transistor Q3, and therefore does not influence the performance of the Bluetooth low noise amplifier 116 being activated.

It will be appreciated that the specific configuration of the first inter-stage matching circuit 330 and the second inter-stage matching circuit 332 may be varied without departing from the scope of the present invention. For instance, the geometry of the transistors Q3 and Q4 may be unequal, and the gain levels of the respective WLAN low noise amplifier 114 and the Bluetooth low noise amplifier 116 may be different. Furthermore, the capacitance provided by the capacitor C23 may be distributed between the capacitors C20 and C21, or alternatively, the capacitance provided by the capacitors C20 and C21 may be consolidated into the capacitor C23.

The various operational states of the transistors Q1, Q2, Q3, Q4 and Q5 in the third embodiment of the front end circuit 100c are understood to be the same as set forth in relation to the first embodiment of the front end circuit 100a. The particular configurations of the circuits in the front end circuit 100c are presented by way of example only and not of limitation.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention with more particularity than is necessary for the fundamental understanding of the present invention, the description taken with the drawings making apparent to those skilled in the art how the several forms of the present invention may be embodied in practice.

What is claimed is:

1. A front end circuit for coupling an antenna to a first radio frequency (RF) transceiver and a second RF transceiver, each of the RF transceivers having a respective one of a signal input, a signal output, a receive enable line and a transmit enable line, the front end circuit comprising:
   an antenna port connectible to the antenna;
   a first power amplifier coupled to the signal output of the first RF transceiver, the first power amplifier including a first transmit control circuit coupled to the transmit enable line of the first RF transceiver;
   a second power amplifier coupled to the signal output of the second RF transceiver, the second power amplifier including a second transmit control circuit coupled to the transmit enable line of the second RF transceiver;
   a combined low noise amplifier base stage coupled to the signal input of the first RF transceiver and the signal input of the second RF transceiver, and including a base receive control circuit coupled to the receive enable lines of the first RF transceiver and the second RF transceiver;
   a first low noise amplifier including a first receive control circuit coupled to the receive enable line of the first RF transceiver;
   a first inter-stage matching circuit coupling the combined low noise amplifier base stage to the first low noise amplifier;
   a second low noise amplifier including a second receive control circuit coupled to the receive enable line of the second RF transceiver;
   a second inter-stage matching circuit coupling the combined low noise amplifier base stage to the second low noise amplifier stage; and
   a matching network coupled to the antenna port, the first power amplifier, the second power amplifier, the first low noise amplifier and the second low noise amplifier, outputs of the first power amplifier and the second power amplifier and inputs of the first low noise amplifier and the second low noise amplifier all being common;
   wherein a corresponding enable signal applied to a one of the first transmit enable line, the second transmit enable line, the first receive enable line, and the second receive enable line activating and setting a bias point of the corresponding one of the first power amplifier, the second power amplifier, the first low noise amplifier, and the second low noise amplifier.

2. The front end circuit of claim 1, wherein the first RF transceiver is a wireless local area network (WLAN) transceiver.

3. The front end circuit of claim 1, wherein the second RF transceiver is a Bluetooth transceiver.

4. The front end circuit of claim 1, wherein the second RF transceiver is a ZigBee transceiver.

5. The front end circuit of claim 1, wherein a junction defined by the combined low noise amplifier base stage, the first inter-stage matching circuit, and the second inter-stage matching circuit has a substantially resistive impedance in a predefined operating frequency.

6. The front end circuit of claim 1, further comprising:
   a first power amplifier input matching circuit coupled to the first power amplifier and the signal output of the first RF transceiver, the first power amplifier being impedance matched with the first RF transceiver.

7. The front end circuit of claim 1, further comprising:
   a first low noise amplifier output matching circuit coupled to the first low noise amplifier and the signal input of the first RF transceiver, the first low noise amplifier being impedance matched with the first RF transceiver.

8. The front end circuit of claim 1, wherein:
   the signal input and the signal output of the second RF transceiver is shared; and
   an output of the second low noise amplifier and an input of the second power amplifier is common.

9. The front end circuit of claim 8, further comprising:
   a first transceiver matching circuit including a first power amplifier input matching segment coupled to the first power amplifier and the signal output of the first RF transceiver, and a first low noise amplifier output matching segment coupled to the first low noise amplifier and the signal input of the first RF transceiver;
   a second transceiver matching circuit including a second power amplifier input matching segment and a second low noise amplifier output matching segment;
   wherein the second power amplifier is impedance matched to the second RF transceiver with the second power amplifier input matching segment, and the second low noise amplifier is impedance matched to the second RF transceiver with a combination of the second power amplifier input matching segment and the second low noise amplifier output matching segment.

10. The front end circuit of claim 1 wherein the first and second power amplifiers, the first and second low noise amplifiers, and the matching network are fabricated on a single die of silicon substrate.

11. The front end circuit of claim 1, wherein the first and second power amplifiers, the first and second low noise amplifiers, and the matching network are fabricated on a single die of gallium arsenide (GaAs) substrate.

12. The front end circuit of claim 1, wherein the first and second amplifiers and the first and second low noise amplifiers have transistor structures selected from the group consisting of: bipolar junction, hetero-junction bipolar, metal semiconductor field effect, metal oxide semiconductor field effect, and high electron mobility.

13. The front end circuit of claim 1, wherein the first and second power amplifiers, the first and second low noise amplifiers, and the matching network are each discrete, interconnected components.

14. The front end circuit of claim 1, further comprising:
a band-pass filter coupled to the antenna port and the matching network.

15. The front end circuit of claim 1, further comprising:
a band-pass filter coupled to the input of the first RF transceiver and the first low noise amplifier.

16. The front end circuit of claim 15, further comprising:
a second band-pass filter coupled to the shared signal input and the signal output of the second RF transceiver, and the common input of the second power amplifier and the output of the second low noise amplifier.

17. The front end circuit of claim 1, wherein the first power amplifier, the second power amplifier, the first low noise amplifier, and the second low noise amplifier are each selectively activated in a substantially exclusive relation to the others.

18. The front end circuit of claim 17, wherein an RF signal generated by a one of the first RF transceiver and the second RF transceiver is amplified and transmitted to the antenna with a respective one of the first power amplifier and the second power amplifier being activated while the other is deactivated.

19. The front end circuit of claim 17, wherein an RF signal received by the antenna is amplified and transmitted to a one of the first RF transceiver and the RF second transceiver with a respective one of the first low noise amplifier and the second low noise amplifier being activated.

20. The front end circuit of claim 17, wherein RF signals received by the antenna are amplified and transmitted to the first RF transceiver and the second RF transceiver with both the first low noise amplifier and the second kw noise amplifier being activated simultaneously.

* * * * *